United States Patent [19]

Chen

[11] Patent Number: 5,714,751

[45] Date of Patent: *Feb. 3, 1998

[54] AUTOMATIC VISOR FOR CONTINUOUSLY REPOSITIONING A SHADING ELEMENT TO SHADE A TARGET LOCATION FROM A DIRECT RADIATION SOURCE

[75] Inventor: Sweetsun Chen, Mountain View, Calif.

[73] Assignee: Emee, Inc., Mountain View, Calif.

[*] Notice: The term of this patent shall not extend beyond the expiration date of Pat. No. 5,298,732.

[21] Appl. No.: 505,332

[22] PCT Filed: Feb. 16, 1994

[86] PCT No.: PCT/US94/02022

§ 371 Date: Mar. 28, 1996

§ 102(e) Date: Mar. 28, 1996

[87] PCT Pub. No.: WO94/19666

PCT Pub. Date: Sep. 1, 1994

[51] Int. Cl.[6] ................................................ G01J 1/20
[52] U.S. Cl. ........................... 250/203.4; 250/206.1; 359/601
[58] Field of Search ................ 250/203.4, 203.1, 250/201.1, 206.1, 206.2; 359/601–608; 345/84, 105

[56] References Cited

U.S. PATENT DOCUMENTS

| 4,874,938 | 10/1989 | Chuang | 250/203.4 |
| 5,258,607 | 11/1993 | Agostini | 250/201.1 |
| 5,305,012 | 4/1994 | Faris | 359/604 |

Primary Examiner—Que Le
Attorney, Agent, or Firm—Townsend and Townsend and Crew LLP

[57] ABSTRACT

The present invention discloses methods and systems for continuously repositioning a shading element to shade an eyepoint from the direct rays originated from a source of radiation. Different ways to simplify the methods are presented, including the use of a repositioning means which continuously repositions the shading element to shade a target location from the direct rays. Also suggested are novel devices to serve as the repositioning means, which may be incorporated in the systems. In embodiments as a visor system on transportation vehicles, this invention avoids a number of shortcomings and limitations of prior systems. It provides practical solutions to the dual problem with conventional visors: their size were too big and too small. This invention enables the vehicle occupants to have a more open field of view while the eyes are always protected from direct sunglare, making it safer and more pleasant to travel.

21 Claims, 8 Drawing Sheets

AUTOMATIC VISOR FOR CONTINUOUSLY REPOSITIONING A SHADING ELEMENT TO SHADE A TARGET LOCATION FROM A DIRECT RADIATION SOURCE

BACKGROUND OF THE INVENTION

There was a dual problem with conventional visors. On the one hand, they were too big. They blocked a very large area of the view. On the other hand, they were too small. The sun could still appear unblocked in sight. Both problems adversely affected driving safety and pleasure.

There were many improvements suggested in the prior art. Some suggested extendable visors; but they would block a larger area of the view, and the sun could still appear unblocked. Some others suggested movable visors or slideable extensions; but it was unsafe and inconvenient to manually move them in response to the movement of the sun. Some also suggested motorizing the visor and incorporating a photodetector, so that the visor would automatically move into its operative position when the sun appeared; but the systems did not have any directional sensitivity.

There were also many suggestions to add directional sensitivity to the visor system. Some suggested using a photodetector, such as: U.S. Pat. No. 3,226,151 issued to Reuther and U.S. Pat. No. 4,641,922 to Jacob. There were suggestions of multiple photodetectors, such as: U.S. Pat. No. 3,961,181 issued to Golden, Japan 55-68422 to Ogawa, U.K. 2090570 to Haardt, and U.S. Pat. No. 4,874,938 to Chuang. Instead of photodetectors, U.S. Pat. No. 4,892,394 issued to Bidabad suggested a compass means. Some of their shortcomings are summarized below.

With Reuther's system, the visor's operating position was fixed. It could not follow the movement of the sun in sight.

Jacob's system would require a substantial research effort to come up with proper tapering shapes for the lightshield and the liquid crystal panel. It was doubtful that the system could reliably work, for there were factors such as the weather that could affect the amount of sunlight received by the photodetector.

Golden's system could only track the sun in one dimension, and it would require a difficult mechanical calibration, most likely by trial and error, for the system to work for a particular driver in a particular placement of the seat. This system had another problem, i.e., the size of the zones, that will be described later.

Ogawa's system only tracked the sun in one dimension, and it required a semi-circular track, which was awkward to be installed on a car. It also required the driver to be seated at the center of the circle. It would not work, if the driver adjusted her seat off the center.

Both Haardt and Chuang suggested extending the visor when the sun appeared at a low elevation. This is undesirable because the visor would block a larger area of the view. In addition, Chuang's system had inherent problems with a small visor. The smaller the visor, the more precisely the system had to position the visor, which in turn required a higher resolution in tracking the sun. Therefore the monitoring territory for each DD (Direction Detector) must be smaller, and there must be more DD's. For example, to achieve 0.5° resolution covering 190° in azimuth angles and 45° in elevation angles, it would need at least 34,200 DD's! Even if the system only supported 2° resolution, it still needed more than 2,000 DD's. It would be very difficult to properly manufacture, mount, wire, and test so many DD's at a reasonably low cost. Moreover, even if we could assemble these DD's, it was still impractical to operate the system with a small visor, because there was no easy way to precisely locate the eyes. It would be very awkward for the driver to rely on a graduated ruler to measure the three-dimensional coordinates of her own eyes relative to the origin of some coordinate system, and then manually insert the coordinates in a certain devised format of instructions via the keyboard.

By nature, the compass means in Bidabad's system could not determine the elevation of the sun. In addition, if the system was calibrated as suggested to move the visor by one sector for every ALPHA degrees change in the heading direction of the vehicle, every sectors had to be properly arranged to subtend the same angle from the driver. But this would require the driver to be seated at a fixed position. If the driver shifted her seat, every sectors would no longer subtend the same angle, and the system would not be able to work.

The Cell-size Issue with Bidabad and Golden's Systems

Both Bidabad and Golden suggested a plurality of cells (sectors or zones) that could be selectively obscured to block the sun. Both systems shared another problem, i.e., the cell size.

Bidabad suggested that the size must be sufficient to shield the user's eyes. Since the eyes are about 7 cm apart, each cell must be at least 7 cm wide. He also suggested to calibrate the system to move the visor by one cell for every ALPHA degrees change in the heading direction of the vehicle. Suppose ALPHA was 5 and the heading direction was about 20°. Due to the road conditions, etc., the heading direction might be oscillating between, say, 19.9° and 20.1°. When it was 19.9°, the cell covering 15° to 20° would be obscured; and when it became 20.1°, the cell covering 20° to 25° would be obscured. Therefore the user would see two cells, each at least 7 cm wide, flashing in front. It would be very distracting and unpleasant to drive.

Golden's system also had a similar problem. He suggested that each cell must be wide enough when darkened to effectively obviate the glaring effect of the sun upon one eye. He also suggested that it was preferred for each cell to be wide enough to shield the eye from the sun, even though the driver moved or turned the head a bit. If we allowed the eye ball to turn, say, 1 cm to the side, each cell must be at least 2 cm wide. If we also allowed the head to turn, say, 2.5 cm to the side, each cell would be about 7 cm wide. With each cell directly wired to a photodetector, there was no way to avoid the flashing effect previously described.

Both Bidabad and Golden required each cell to be large enough to shield the intended object. (For Bidabad, the intended object was the eyes. For Golden, it was a single eye.) But the present inventor finds it much better to do the contrary, namely, each cell should not be so big as to completely shade the intended object; and the smaller the cell, the better. For example, if Bidabad's system had been modified so that each cell was 20 times narrower, we would have had to obscure at least 20 cells to shade the eyes. The flashing effect, if not eliminated by any intelligent processing, would only have appeared on the left and right end of the visor. With each cell only 1/20 as wide as the visor, the flashing would not have been so distracting as the cases where the cell was as wide as the visor. Moreover, the visor's movement would have appeared smoother; and it would have been possible for the size and shape of the visor to be easily adjustable to match the desired accuracy, the distance between the eyes, the distance from the visor to the eyes, and any particular placement of the driver's seat, etc.

Objects

It is therefore an object of the present invention to provide a practical solution for the dual problem mentioned hereinbefore. It is another object to provide methods and systems generally useful for continuously repositioning a shading element to shade an eyepoint from the direct rays originated from a source in motion relative to the eyepoint. It is another object to provide an automatic visor system that avoids some of the limitations of the prior systems. It is another object to provide such a system that may work with a small shading element. It is another object to provide such a system with means for precisely determining the location of the eyepoint. It is another object to provide such a system with practical means for providing spatial information relating to the source at a high precision. It is another object to provide such a system with a visor that may vary its size according to its distance from the eyes, the desired precision of the system, and the distance between the eyes. It is another object to provide such a system with a non-mechanical visor, for safety and ease of installation and maintenance. It is another object to provide such a system that works even if the eyes' location frequently changes.

These objects, as well as some other objects, features, and advantages of the present invention will be clear with the particular embodiments and accompanying drawings that follow, which are not to be regarded as limiting the scope of the present invention.

These figures are not drawn to scale.

DETAILED DESCRIPTION

The methods and systems of the present invention are generally useful for continuously repositioning a small object to be always in line with two points of interest that are in motion relative to each other. In a specific application, they are useful for continuously repositioning a shading element to precisely shade an eyepoint from the direct rays originated from a source of radiation in motion relative to the eyepoint.

Figure 1:
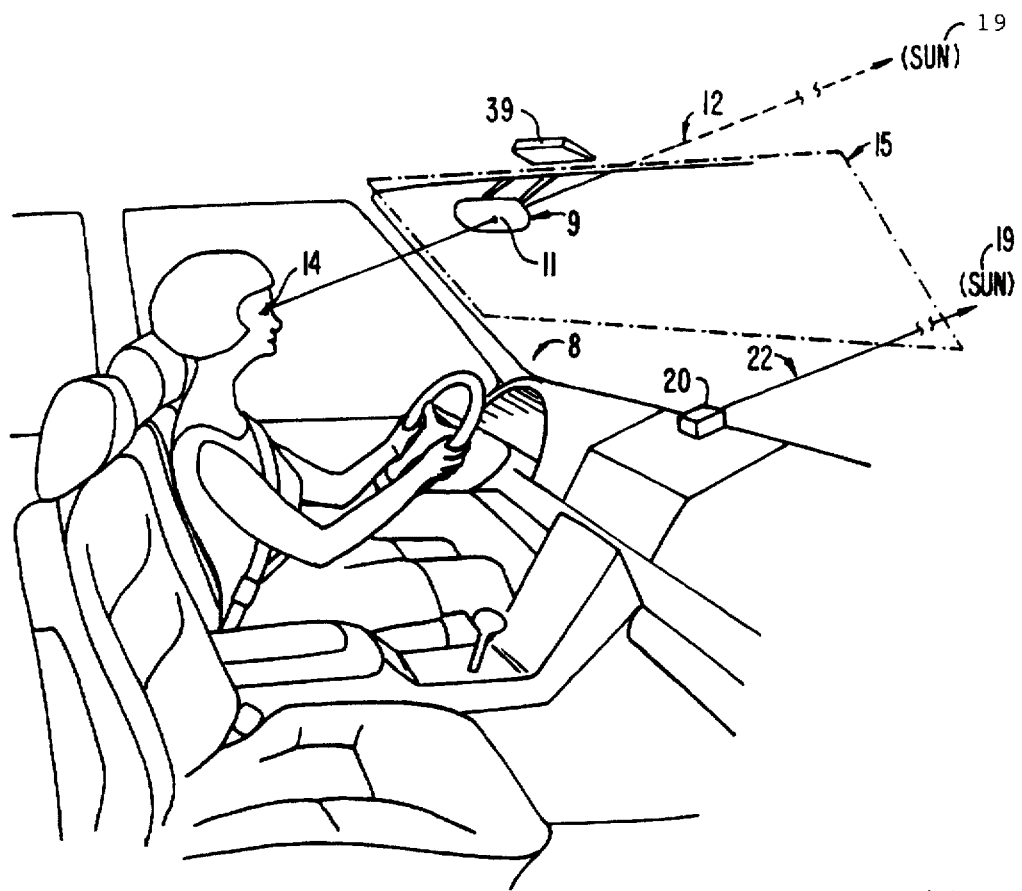
FIG. 1 is an internal view of an automobile.

FIG. 1 shows an automatic visor system installed on a car. In this embodiment, the source is the sun 19, the radiation is the sunlight, the eyepoint 14 is the location of a vehicle occupant's eyes, and the shading element 9 is a visor, which is always repositioned to shade the eyepoint from direct sunlight 12.

Methods

A method of the present invention comprises the following three steps:

(a) Find at least two geometric entities containing the eyepoint. Preferably the intersection of the geometric entities only contains a single point in space, or approximates a single point for practical purposes.

(b) Find a point in the intersection of the geometric entities.

(c) Continuously reposition the shading element to shade the point found in step (b) from the direct rays.

For example, the geometric entities may be two eye-source lines. An eye-source line is one which connects the eyepoint and the source. In this embodiment, the method comprises the following three steps:

(a) Find two eye-source lines.

This step may comprise the following two substeps:

(a.1) When the source is located at a first location, obtain spatial information sufficient for determining the first eye-source line, which connects the eyepoint and the first location of the source. Examples of the spatial information are: the locations of any two points on the line, the direction of the line and the location of any point on the line, etc.

(a.2) Similar to substep (a.1), when the source is located at a second location significantly away from the first eye-source line, obtain spatial information sufficient for determining the second eye-source line, which connects the eyepoint and the second location of the source.

(b) Find the point of intersection of the two eye-source lines.

(c) For any location that the source may be, continuously reposition the shading element to be substantially in line with the point of intersection and the source, so that the point of intersection is continuously shaded by the shading element from the direct rays.

For example, step (c) may be accomplished by repeating the following three substeps:

(c.1) Obtain spatial information sufficient for determining the line connecting the point of intersection and the current location of the source.

(c.2) Based on the location of the point of intersection and the spatial information obtained in substep (c.1), select a shading position substantially in line with the source and the point of intersection, so that the shading element positioned at the shading position will shade the point of intersection from the direct rays.

(c.3) Position the shading element at the shading position.

Since the point of intersection should be coincident with, or sufficiently close to, the eyepoint, if we repeat substeps (c.1), (c.2) and (c.3), the shading element will always shade the eyepoint from the direct rays.

Simplification with Imaginary Source

The method may appear to be simplified if the source in substeps (a.1) or (a.2) above is imaginary and located at some known location or direction significantly away from the actual source. To determine the line connecting the eyepoint and the imaginary source, we only have to find the location of a point on the line. Also, step (a) may be accomplished with the actual source at one location. For example, if in substep (a.1) the source is imaginary, we do not have to wait for the actual source to move to a different location to do substep (a.2).

Simplification with Repositioning Means

The method can also appear to be simplified if we use a repositioning means which continuously repositions the shading element so that a target location in space is always shaded by the shading element from the direct rays. The exact target location is known to the repositioning means; but it may not be known to the user. The repositioning means does not require a physical target at the target location to operate. However, for simplicity of description, we may assume an imaginary target at the target location. Thus, if we say "moving the target," it will mean "changing the target location;" and the terms "target" and "target location" are often used interchangeably hereinafter.

Repositioning Means. A typical repositioning means may comprise the following:

(1) Means for positioning the shading element.

(2) A source-tracking means for providing spatial information relating to the source.

Assume that the spatial information is sufficient for the target-source line to be determined. A target-source line is one which connects the target and the source. An example of the spatial information is the location of the source. Since the target location is also known, we can certainly determine the target-source line.

(3) Means for selecting a shading position substantially in line with the target and the source, in accordance with the spatial information obtained in (2) and the target location, so that the shading element positioned at the shading position will shade the target from the direct rays.

(4) Means for producing signals for the means for positioning the shading element to position the shading element at the shading position selected in (3).

With the repositioning means, the shading element can be moved by "moving the target." If the geometric entities in step (a) are the eye-source lines, the method may become the following:

(a) Find two eye-source lines using the following two substeps:

(a.1) When the source is located at a first location, move the target until the shading element is repositioned by the repositioning means accordingly to a position where the eyepoint is shaded from the direct rays.

(a.2) Similarly, when the source is located at a second location significantly away from the first eye-source line, move the target until the shading element is repositioned to shade the eyepoint from the direct rays.

(b) Find the point of intersection of the two eye-source lines.

(c) Move the target to the point of intersection.

In substep (a.1) or (a.2), when the target is moved so that the shading element shades the eyepoint, if the shading element is small, both the target and the shading element must be substantially in line with the eyepoint and the source. Since the spatial information provided by the source-tracking means is sufficient for determining the target-source line, the spatial information for determining the eye-source lines is automatically obtained.

Step (c) also appears to be simplified due to the functionality of the repositioning means. Recall that the point of intersection should be coincident with, or sufficiently close to, the eyepoint. Because the repositioning means always repositions the shading element to shade the target from the direct rays, with the target coincident with the point of intersection, the shading element will shade the eyepoint from the direct rays.

Simplification with Repositioning Means and Constrained Target Movement

If in substep (a.2) above we constrain the target's movement to be along the first eye-source line, the method will appear even more simplified. Namely, with the repositioning means, the method will appear to comprise only one explicit step, i.e., step (a), with the following two substeps:

(a.1) when the source is located at a first location, move the target until the shading element shades the eyepoint; and (a.2) when the source is located at a second location significantly away from the first eye-source line, move the target along the first eye-source line until the shading element shades the eyepoint.

When substep (a.2) is done, the target should already be located at the point of intersection, therefore steps (b) and (c) are automatically accomplished at the same time, and there is no need to explicitly perform steps (b) and (c) after step (a).

Simplification with Repositioning Means, Constrained Target Movement, and Imaginary Source The coordinate system being used may be Cartesian in which the three axes, say, the x, y, and z axes, are perpendicular among one another.

In substep (a.1) above, we assume an imaginary source sufficiently remote from the target, so that the target-source line is always parallel to one of the axes, say, the z axis. The repositioning means continuously repositions the shading element to shade the target from the imaginary rays instead of the actual rays. Since the imaginary rays are parallel to the z axis, when the shading element is repositioned to shade the eyepoint from the imaginary rays, the target's x,y-coordinates will be the same as those of the eyepoint.

In substep (a.2), the repositioning means continuously repositions the shading element to shade the target from the actual rays, and the target is constrained to move along the first eye-source line. Since the first eye-source line is parallel to the z axis, only the z-coordinate of the target may change. When the shading element is repositioned to shade the eyepoint, the target's z-coordinate will be the same as that of the eyepoint.

Thus the method will appear to only comprise one explicit step, step (a), with the following two substeps:

(a.1) Change the x,y-coordinates of the target until the shading element shades the eyepoint from the imaginary rays.

(a.2) Change the z-coordinate of the target until the shading element shades the eyepoint from the actual rays.

Similarly, the method may be applied to a two-dimensional coordinate system.

Methods with Direct Eyepoint Determination

Another type of the methods of the present invention comprises the following two steps:

(a) Determine the location of the eyepoint using an automatic locating equipment, such as one that locates an object by generating and receiving acoustic or electromagnetic waves; and (b) Continuously reposition the shading element sufficiently in line with the source and the determined location of the eyepoint, so that the shading element shades the determined location from the direct rays.

With a repositioning means, the step (b) above will be simply moving the target to the determined location. More specifically, the method becomes:

(a) Determine the eyepoint's location using an automatic locating equipment; and (b) Move the target to the determined location.

This type of method is particularly useful when the eyepoint is not stationary. We may continuously repeat the two steps, so that the eyepoint will always be shaded.

Systems

A system of the present invention comprises the following:

(1) a shading element;

(2) a holding means for holding electrical values representing a target location;

(3) a repositioning means for continuously repositioning the shading element to shade the target location, which is represented by the values held by the holding means, from the direct rays originated from the source; and (4) a calibrating means in an electric circuit with the holding means and the repositioning means, for determining the location of the eyepoint and changing the values held by the holding means to represent the determined location of the eyepoint.

Shading Element

The shading element may be made of any material that filters, blocks, scatters, or diminishes the radiation from the source. For example, it can be made of plastic, electrochromic material, or liquid crystals, etc.

The shading element can be very small, preferably close to the minimum size required to produce an umbra covering the intended object at the eyepoint. Take the embodiment of a visor system on an automobile as an example. The sun only subtends about 0.5° from the driver's eye. Therefore if the visor consists of two coin-sized plates positioned near the windshield and separated by a distance the same as that between the two eyes, this two-plate visor will be large enough to shade both eyes from the sunlight. If the system only works for a stationary eyepoint, the size of these plates may be enlarged a bit to allow some room for the driver to move her head and eyes during travel without being dazzled by the sun.

Holding Means

The holding means serves to hold some electrical values which represent a location in space, i.e., the target location. The electrical values are referenced by the repositioning means and may be changed by the calibrating means. For example, the values may be the digital representations of the target's coordinates; and the holding means may be a memory device in the circuit. The values in the memory are readable by the repositioning means and writeable by the calibrating means.

Calibrating Means

The calibrating means serves to determine the location of the eyepoint, relieving the user from the trouble of directly measuring the eyepoint's location using a graduated ruler. The calibrating means automatically changes the values so that they represent the determined location of the eyepoint.

The calibrating means may comprise means known in the art for locating an object, such as one that generates and receives infrared light or acoustic waves, or one that captures and analyzes the object's images, etc. This kind of calibrating means is particularly useful in cases where the eyepoint is always moving, because the calibrating means may comprise means that continuously determines the current eyepoint and moves the target to the determined eyepoint.

However, in cases where the eyepoint's location does not change too much or too often, the calibrating means does not have to comprise any means that generates waves. For example, if the calibrating means comprises (1) means for the user to change the values that represent the target location, so that the eye-source line may be found by the user changing the values until the repositioning means repositions the shading element accordingly to a position where the direct rays to the eyepoint are shaded by the shading element; and (2) means for automatically computing the intersection of two eye-source lines and changing the values to represent the computed intersection; then the system will work with the three-step method described before and continuously shade the eyepoint from the direct rays.

Alternatively, if the calibrating means comprises (1) means for the user to freely change the values and (2) means for the user to change the values under the constraint that the target only moves along the first eye-source line, then the system will work with the simplified one-step (two-substep) method previously described.

Refer to FIG. 1. The calibrating means may comprise some switches on a control panel 39. The switches are connected to the control circuit, which is designed so that the values representing the target location may be changed in the different ways described above by pushing the switches.

Repositioning Means

The repositioning means may be similar to what is described before. For example, it may comprise:

(1) means for positioning the shading element;

(2) a source-tracking means for providing spatial information relating to the source; and (3) means for selecting a shading position in accordance with the values held by the holding means and the spatial information provided by the source-tracking means, and producing signals for the means for positioning the shading element to position the shading element at the shading position, so that the target is shaded from the direct rays.

Note that the repositioning means itself may be used as an automatic visor system, provided that the target happens to coincide with the eyepoint or that the shading element is sufficiently big so that, even if the target does not coincide with the eyepoint, the user's eyes can still be shaded from the direct rays. However, a big shading element is undesirable, as explained before.

The means for positioning the shading element may comprise any conventional means that can support and move the shading element. For example, the visor may be mechanically supported and driven by electric motors to the shading position. A non-mechanical alternative is to divide the windshield surface into a number of cells, and obscure the cells in the vicinity of the shading position to form the visor. It is preferred that each cell is sufficiently small, so that the visor is formed by a plurality of cells, in order to support precise visor positioning, smooth visor movement with less distraction for the driver, and easy adjustment of visor's size and shape to cope with different visor-to-driver distance, different eye-to-eye separation, and different placement of the driver's seat, etc. A mechanical positioning means may cost less, but it may be less responsive, harder to maintain, and more dangerous. (An unguarded, fast moving visor inside the vehicle can be hazardous for the occupants.)

As to the means for selecting the shading position and producing signals, it may comprise a logic circuit. It can be very cost effective to use a programmable device such as a microprocessor operating under a program control.

The source-tracking means may directly provide the spatial information. For example, if the source follows a known schedule of movement, the source-tracking means may comprise means that directly provides the location or direction of the source according to the schedule. The source-tracking means may also provide the spatial information indirectly. For example, it may comprise means that captures the images of the source from some known perspectives. The images by themselves do not directly represent the location or direction of the source, but the location and direction may be derived from the images and the known perspectives. Thus the source-tracking means has many different variations. Following are some more examples:

Variation 1. The source-tracking means may comprise the following:

(1) means to determine the location of the earth relative to the sun using, say, a clock and a software function which tells the location of the earth relative to the sun at any given time based on well known astronomical data;

(2) means to determine the location of the car relative to the earth using, for example, a global positioning satellite system;

(3) means to determine the attitude of the car using, say, a magnetometer; and (4) means to determine the inclination of the car using, for example, a two directional level and some photodetectors.

Based on the information provided by this kind of source-tracking means, the microprocessor may determine the location of the sun in the coordinate system which moves with the car. Knowing the location for the sun, the target location, and the geometry of the shading surface (on which the visor moves), the microprocessor may select the shading position by finding the position where the shading surface intersects with the line connecting the sun and the target.

Variation 2. The source-tracking means may comprise a clock and a subroutine which tells the current direction of the sun based on astronomical data. The system is installed at a window of a building instead of a moving vehicle. The shading position is selected by finding the intersection of the window surface (on which the visor moves) and the line which contains the target and is in the direction given by the subroutine.

Variation 3. In cases where the sunvisor only has one degree of freedom to move, the source-tracking means may comprise a plane-finding means. The plane-finding means is installed in a known orientation, and it serves to provide information so that a reference plane containing the sun (or a point sufficiently close to the sun for our purposes) and a known line may be determined.

Figure 2:
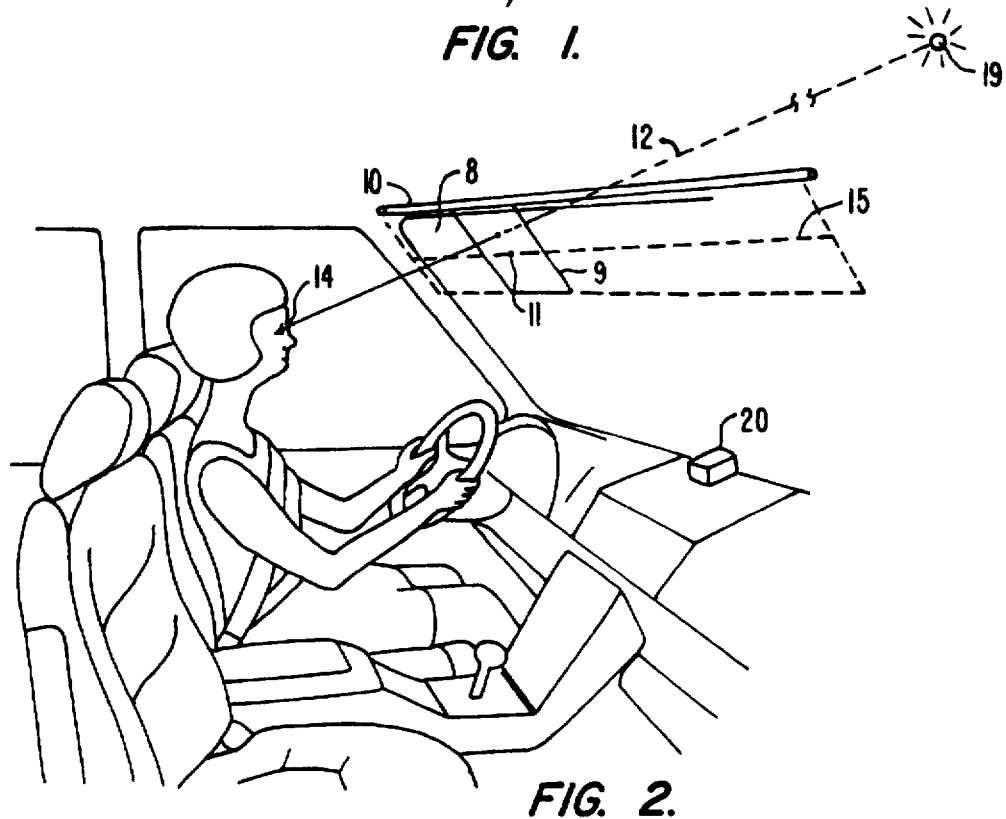
FIG. 2 is an internal view of an automobile.

For example, refer to FIG. 2, which shows an internal view of an automobile. The visor 9 of this embodiment may move along a track 10 behind the windshield 8. The visor is narrow in the horizontal direction, but it is wide enough to shade both eyes from direct sunlight 12 when it is positioned in line with the sun 19 and the eyes. The vertical size of the visor is sufficient to cover a desired range of elevation angles of the sun. We use the middle point between the two eyes as the eyepoint 14. The trace where the center 11 of the visor may pass forms a shading curve 15.

Figure 3:
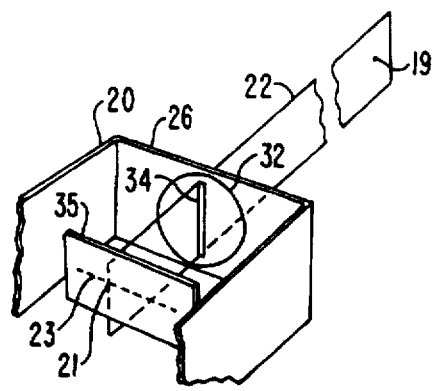
FIG. 3 shows a plane-finding means.

A plane-finding means is housed in a box 20 on the cowl. FIG. 3 shows the interior of the box. The plane-finding means comprises a one-dimensional CCD (Charge Coupled Device) 35 and a narrow slit 34 on the front wall 26 of the box. The array 23 of photoresponsive sites on the CCD are arranged horizontally. The slit is cut vertically, with a width substantially smaller than the overall length of the array, so that the sunlight passing through the slit strikes on a very small segment of the array. The center point 21 of this segment and the line of the slit determines the reference plane 22 which contains the sun 19. An optional lens or filter 32 may be used to focus the sunlight or reduce its strength.

The microprocessor may compute the shading position by finding the position where the shading curve intersects with the plane which contains the target and is parallel to the reference plane.

Variation 4. In cases where the sunvisor may move in two dimensions, the source-tracking means may comprise a line-finding means. The line-finding means is installed in a known orientation, and it provides information so that a reference line containing the sun (or a point sufficiently close to the sun for our purposes) and a known point may be determined.

Figure 4:
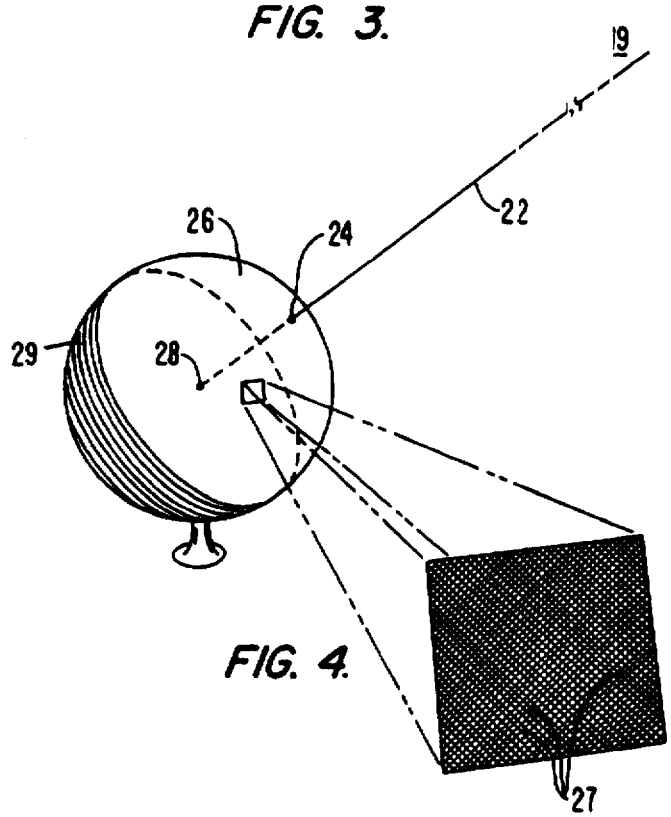
FIG. 4 shows a line-finding means.

FIG. 4 shows an example in which the line-finding means comprises a number of photodetectors 27 spanning the surface of a sphere 29. The sphere is fixed on the vehicle. The location of the center 28 of the sphere is known, and it may serve as the aforementioned known point. At any instant in time, only those photodetectors on the hemisphere 26 facing the sun 19 are exposed to direct sunlight. The reference line 22 is the one that connects the center 28 of the sphere and the center point 24 on the surface of the hemisphere.

The system may be installed on a car like what is illustrated in FIG. 1, with the source-tracking means enclosed in a transparent box 20 behind the windshield 8. Given the location of the target and the geometry of the shading surface 15 on which the shading element moves, the control circuit may determine the reference line 22 and compute the shading position 11 as the position where the shading surface intersects with the line which contains the target and is parallel to the reference line.

Figure 5:
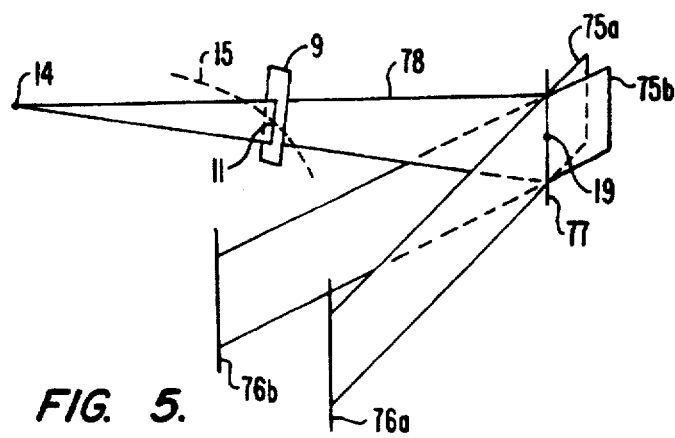
FIG. 5 illustrates how the shading position may be determined with two plane-finding means.

Variation 5. In cases where the source is not remote and the shading element is only movable in one dimension, the source-tracking means may comprise, for example, two plane-finding means. Refer to FIG. 5. The shading element 9 only moves in one dimension. The locations and orientations of the plane-finding means on the vehicle are known. Each plane-finding means provides information so that a reference plane 75 containing the source 19 and a known line 76 may be determined. If a plane-finding means such as the one in Variation 3 is used, the known line may be the line of the slit. Preferably, the two known lines 76a and 76b are parallel to each other and both are perpendicular to the dimension in which the shading element moves. The two reference planes must intersect on a reference line 77 which contains the source 19. Since the shading element has one degree of freedom to move, its center may move along a shading curve 15. The repositioning means may determine the shading position 11 by finding the intersection of the shading curve 15 with the plane 78 defined by the reference line 77 and the target 14.

Figure 6:
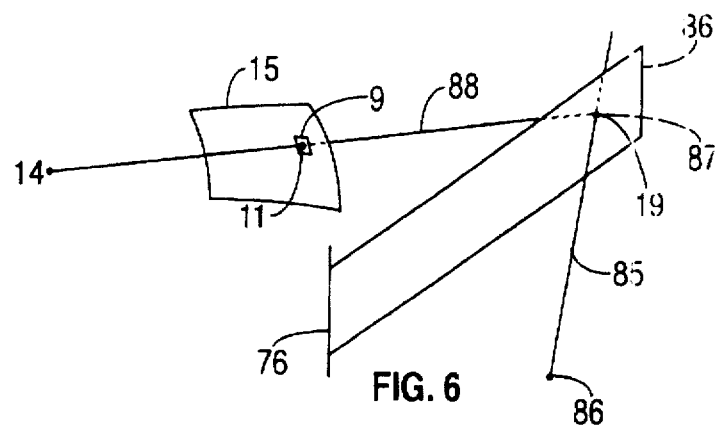
FIG. 6 illustrates how the shading position may be determined with a plane-finding means and a line-finding means.

Variation 6. Refer to FIG. 6 for another embodiment. In cases where the source 19 is not remote from the system, and the shading element 9 is movable in two dimensions, the source-tracking means may comprise a plane-finding means and a line-finding means. For example, the plane finding means may be a one-dimensional PSD (Position-Sensitive Detectors) from Hamamatsu Corporation, and the line-finding means may be a two-dimensional PSD. The plane-finding means provides information so that a reference plane 75 containing the source 19 and a known line 76 may be determined. The line-finding means provides information so that a reference line 85 containing the source 19 and a known point 86 may be determined. The reference plane and the reference line must intersect at a reference point 87, where the source is located. Since the shading element has two degrees of freedom to move, all possible positions of its center forms a shading surface 15. The shading position 11 may be computed as the intersection of the shading surface with the line 88 defined by the reference point 87 and the target 14.

Evidently, there are many variations of the source-tracking means that can serve our purposes. A preferred source-tracking means comprises means responsive to the radiation. The response per se does not represent the spatial information relating to the source. However, the spatial information may be derived. The derivation is dependent not only on the response but also on the geometric configuration of the source-tracking means.

It is also preferred that the source-tracking means comprises a sensing means and a varying means. The sensing means comprises a number of sensing sites on a sensing region responsive to the radiation. For example, the sensing means may be a CCD, a video camera tube, an exposed RAM (Random Access Memory) such as the Optic RAM from Micron Technology, or a cluster of photodetectors, etc. The varying means may be an aperture, a lens, and/or a surface of a known geometry, etc., that causes an uneven distribution of the radiation over the sensing sites. The varying means may allow multiple sensing sites to be exposed to the radiation at the same time. Instead of relying on each sensing site to detect a predetermined direction, the system selects the shading position in accordance with the location of the target, the distribution of the radiation, and the geometric configuration of the source-tracking means.

These kinds of source-tracking means are better than those directional sensors employed in the prior visor systems in many respects. Some of the major advantages are the following:

(a) They allow a plurality of directions of sunlight to be determined, unlike the sensor suggested by Reuther, which could only identify a single direction.

(b) They allow the direction of the sun to be determined with a high reliability, unlike the sensor suggested by Jacob, of which the accuracy might be affected by the weather.

(c) They can track the sun in one or two dimensions, unlike Bidabad's compass means which could not track the elevation of the sun.

(d) They do not require complex auxiliary structures, such as the multitude of light paths suggested by Chuang and the specially tapered light shield suggested by Jacob, that were difficult to be made to support the desired high precision and accuracy.

(e) They do not require mechanical moving parts such as the moving sensor suggested by Ogawa and the adjustable light-sensing structures suggested by Golden.

(f) Unlike the DD's suggested by Chuang, they do not require a multitude of components to be carefully installed in predetermined orientations.

(g) Unlike what is suggested by Golden, they do not require the same number of liquid crystal zones as the photodetectors and the difficult adjustment necessary for obtaining an exact geometric similarity among different parts of the system.

(h) The sensing means, such as CCD or RAM, are already available commercially in large quantities, with high resolution, high reliability, and reasonably low cost. Also available are means for scanning the sensing sites for these devices, eliminating the need to provide individual wiring to the multitude of detectors as suggested by Chuang or Golden.

Systems with Exposing Means

In another embodiment of the invention, the visor system comprises the following:

(1) a shading element;

(2) an exposing means which alternatingly exposes one of the two eyes to a field of view;

(3) a repositioning means which continuously repositions the shading element to shade a target location from the direct rays originated from a source of radiation; and (4) means for changing the target location to the location of the exposed eye.

The exposing means may comprise, for example, a pair of electronic light-shutters in front of the eyes, so that the eyes are alternatingly exposed to the field of view. When one of the light-shutters is opened, the other is closed at the same time. The light-shutters take turns to be opened and closed so that when one of the eyes is exposed to the field of view, the other eye is prevented from seeing the view or that its view is significantly faded. It is preferred that the frequency of exposure for each eye is high enough that objects' movement appears to be continuous and the user does not sense the discontinuity of the alternating exposure.

The target always coincides with the exposed eye, so that the shading element is repositioned by the repositioning means to shade the exposed eye from the direct rays, leaving most of the view open for the exposed eye.

An advantage of this embodiment is that the size of the shading element can be reduced even further, to about 50% less than required for equivalent visor systems without the exposing means.

Advantages

The present invention has reduced to practice automatic visor systems on a transportation vehicle. The occupant in the vehicle does not have to manually move the visor or its extensions, but she can enjoy a broad field of view while her eyes are always shaded from direct sunglare. It works even though the sun may move relative to the vehicle, the road may curve, the occupant's head may turn, the placement of the seat may change, and the occupant may be replaced by someone of a different height. The invention can also be applied to shade the eyes from the headlight glare of on-coming vehicles. The systems not only make it more pleasant to drive, but also increase the safety of driving. In addition to land transportation, the visor systems can be used for transportation on water and in the air. They can also be installed on places other than a moving vehicle.

Some advantages of the visor systems of the present invention over conventional automatic visor systems are listed below:

(a) In some preferred embodiments, the systems comprise means for easy and precise determination of the location of the eyes, eliminating the need to manually measure the location of the eyes. With precise eyepoint location, it is made possible to precisely position a small visor.

(b) In some preferred embodiments, the systems comprise means for automatically changing the location of the target to the determined location of the eyes, eliminating the need to manually input the coordinates of the eyes to the system.

(c) In some preferred embodiments, with means that can continuously determine the location of the eyes and continuously move the target to the current location of the eyes, the systems can always adjust themselves to work, even if the location of the eyes keeps changing.

(d) In some preferred embodiments, major components of the systems have been available commercially with a high precision and reliability at a low cost.

(e) In some preferred embodiments, the systems can support the high precision required for a visor significantly smaller than conventional visors. The driver can therefore have a broader view of the road conditions ahead, and it is less likely for the visor to block the view of traffic signals and signs. Although the visor is small, it can be precisely positioned to shade the eyes from direct sunlight in many different directions. The dual problem mentioned earlier is therefore resolved.

(f) In some preferred embodiments, the systems have no moving parts. Moving parts may not be very reliable, and a fast moving visor may seriously affect the safety of the occupants in the vehicle.

(g) In some preferred embodiments, the systems do not require any parts to be installed at awkward places on the vehicle.

(h) In some preferred embodiments, the size of the visor may vary according to its distance from the eyes, the distance between the eyes, as well as other factors, so that its size may be kept close to the minimum required to cast an umbra covering the eyes.

(i) The present invention also avoids many other limitations of the prior systems described before, which required seating the driver at a fixed location, conducting a difficult research for the special tapering shapes, ensuring an exact geometric similarity among parts, or using light-shielding cells of a size that would distract driver's attention when the visor moves, etc.

These advantages, as well as some others will be clear with the following examples with more specific details.

EXAMPLE 1

Figure 7:
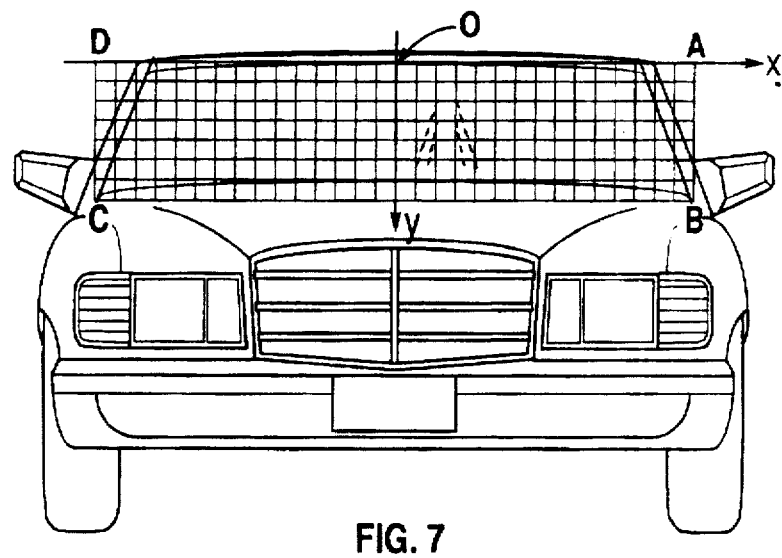
FIG. 7 shows the front view of an automobile.

FIG. 7 shows the front view of an automobile installed with one embodiment of this invention as an automatic visor system. A three-dimensional coordinate system is used. The origin O is at the center of the top edge of the windshield. The x axis points to the left side of the vehicle; the y axis points down; and the z axis points to the rear of the vehicle. The unit of length is cm.

Visor

Figure 8:
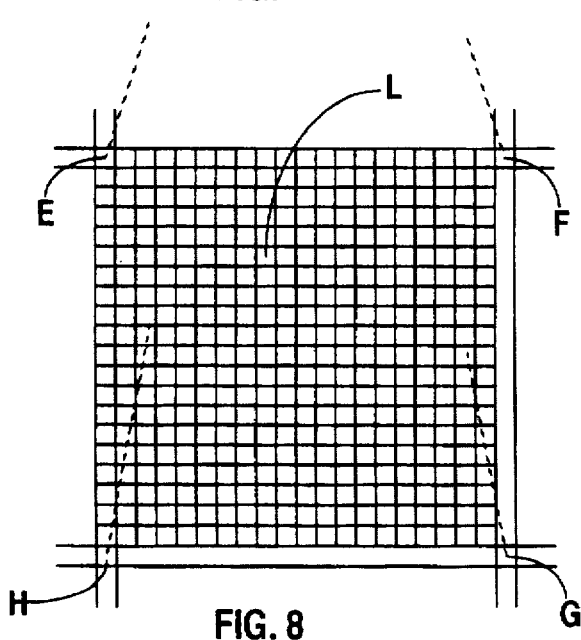
FIG. 8 shows the layout of liquid crystal cells in a small area on a windshield.
Figure 9:
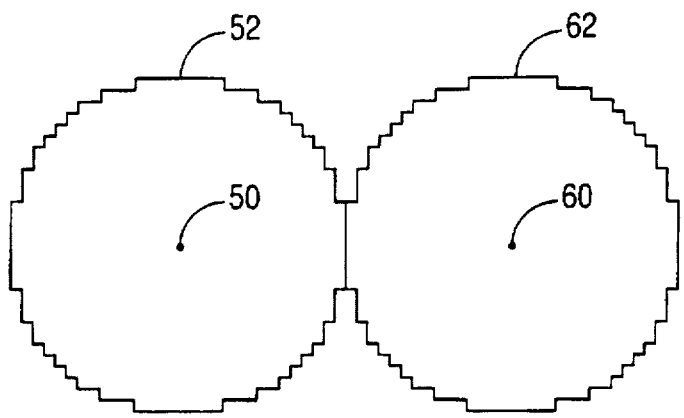
FIG. 9 shows the outline of a liquid crystal visor.

Imagine a grid on the windshield surface as shown in FIG. 7. Viewed in the z direction, the grid lines are either horizontal or vertical, and each mesh in the grid is a square of 5 cm sides. For ease of description, we assume the windshield is expanded so that it appears like a rectangle ABCD when viewed in the z direction. FIG. 8 shows a magnified view of a mesh EFGH. A multitude of liquid crystal cells L span the windshield surface, so that there are 20 by 20 cells in each mesh. The cells may be selectively obscured to form a shading element, i.e., the visor. FIG. 9 shows a design of the visor comprising two approximately round subareas about 7 cm in diameter. When the visor is positioned in line with the sun and the eyes, subarea 52 is large enough to shade one of the eyes from direct sunlight; so is subarea 62 for the other eye. The center 50-to-center 60 distance between the subareas is about 7 cm, so that the visor can be used for drivers whose eyes are about 7 cm apart.

Positioning the Visor

The system comprises a microprocessor executing a program. The main procedure, AutoVisor, in the program will be described later. The MoveVisor procedure PROCEDURE MoveVisor(visor$_x$, visor$_y$: REAL);

is used to display the visor at any desired position on the windshield. We choose the middle point between the eyes as the eyepoint, so the visor's position is given in terms of the x,y-coordinates of the visor's center. This procedure sets a bit pattern in the memory, each bit corresponding to a cell on the windshield. A display controller continuously displays the bit pattern on the windshield so that the visor appears at the desired position, the shading position. When the power to the system is turned off, all the liquid crystal cells are transparent. When the shading position is close to the edge of the windshield, the visor may be partially visible.

Source-tracking Means

Figure 11:
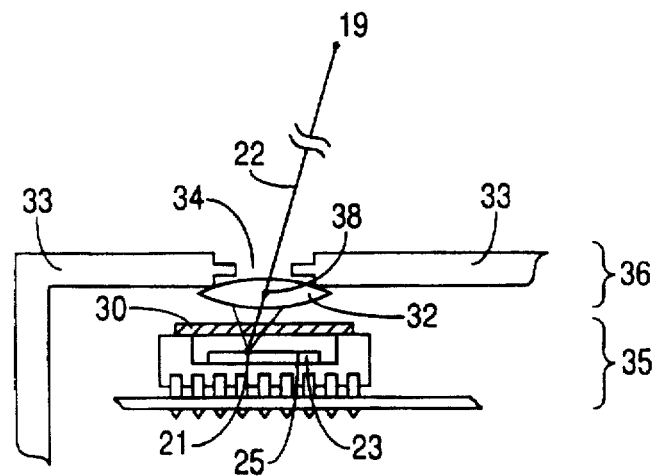
FIG. 11 shows a cross-sectional view of a source-tracking means.

FIG. 11 shows a cross-sectional view of the source-tracking means, which can be installed anywhere on the car where the sunlight is not obstructed. The source-tracking means comprises a sensing means 35 and a varying means 36. The sensing means comprises a two-dimensional CCD, which has a two-dimensional matrix of light sensitive units 23 forming a sensing surface 25. The varying means comprises a lens 32 and an enclosure 33 which has an aperture 34. The sensing means is enclosed inside the enclosure, so that the sunlight is prevented from reaching the sensing surface except when it passes through the aperture. The lens confines the sunlight that passes through the aperture to strike at a small area on the sensing surface. If desired, we can use an aperture substantially smaller than the size of the sensing surface, so that without a lens the sunlight passing through the aperture is also confined to a small area on the sensing surface. A filter 30 can be placed in front of the CCD to reduce the intensity of sunlight, so that only direct sunlight passing through the filter can produce an amount of charge at the sensing units beyond a certain threshold value.

For simplicity of description, the center point 21 of the small area where the sunlight strikes is called the point of incidence. The sensing means and the varying means together form a line-finding means. It is so named because the point of incidence and the optical center 38 of the lens determine a reference line 22, which passes through the sun 19. The determination of the reference line can be very precise. Many commercially available CCD's can support an angular resolution well within a fraction of a degree.

Another coordinate system, u-v-w, is used. The origin is at a corner of the rectangular sensing surface. The u axis is on a longer edge of the rectangle, and the v axis is on a shorter edge. The w axis is perpendicular to the sensing surface. The point of incidence is found by calling the GetPointOfIncid procedure.

PROCEDURE GetPointOfIncid(VAR incid$_u$, incid$_v$: REAL);

This procedure scans the sensing units to see which of them have been excited by the beam of light, i.e., accumulated an amount of charge beyond a threshold value. Then it returns the u,v-coordinates of the center point of the cluster of excited units. Since the point of incidence is on the sensing surface, its w-coordinate is always 0.

Rectifying the Source-tracking Means

The source-tracking means is mounted on the vehicle, preferably with the u, v, and w axes being parallel to the x, y, and z axes, respectively. However, they do not have to be exactly so. The source-tracking means may be "rectified" with software so that its response is properly interpreted.

Figure 12:
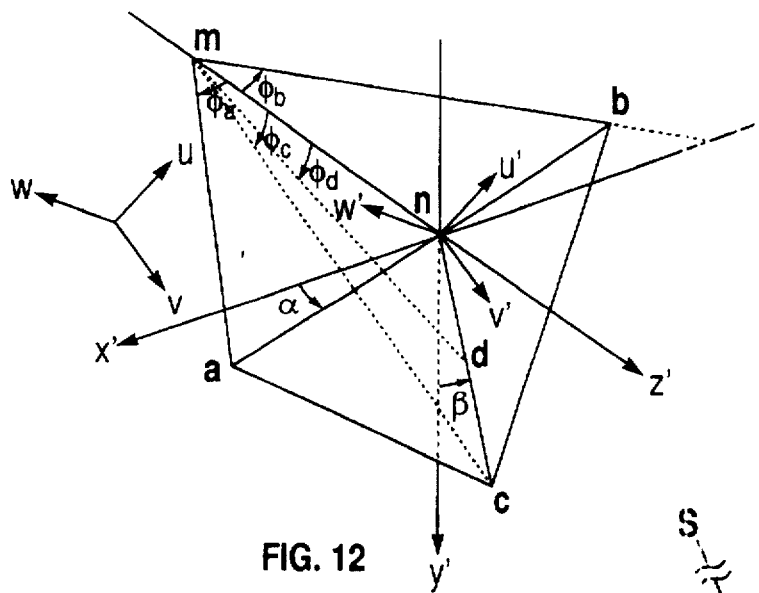
FIG. 12 shows four beams of light reaching a sensing surface.

Refer to FIG. 12, which shows three coordinate systems: u-v-w, x'-y'-z', and u'-v'-w'. The x', y', and z' axes point to the same directions as the x, y, and z axes, respectively. The z' axis passes through the optical center m of the lens. The origin of the x'-y'-z' coordinate system is located at point n, where the z' axis crosses the sensing surface. The origin of the u'-v'-w' coordinate system is also n. The u', v', and w' axes point to the same directions as the u, v, and w axes, respectively. For simplicity of description, we use cm as the unit of length in all these coordinate systems. Note that in this example we use a bold-faced letter to represent a point or a vector in space.

To rectify the source-tracking means, we may send a beam of light to the source-tracking means four times in different but known directions. For example, as shown in this figure, the beam reaches the sensing surface at a, b, c, and d, forming angles $\phi_a$, $\phi_b$, $\phi_c$, and $\phi_d$ with the z'-axis. ma and mb are on the x'-z' plane; mc and md are on the y'-z' plane. The u,v-coordinates for each point of incidence can be obtained by calling the GetPointOfIncid procedure. Then the coordinates for point n can be derived as follows.

$$n_u = [(a_u b_v - a_v b_u)(c_u - d_u) - (c_u d_v - c_v d_u)(a_u - b_u)]/f \quad (1)$$

$$n_v = [(a_u b_v - a_v b_u)(c_v - d_v) - (c_u d_v - c_v d_u)(a_v - b_v)]/f \quad (2)$$

where $$f = (a_u - b_u)(c_v - d_v) - (a_v - b_v)(c_u - d_u).$$

The distance of points a, b, c, and d from point n, denoted by normal faced letters a, b, c, and d, respectively, can be derived. Then we can calculate the angle $\alpha$ between line ab and the x'-y' plane, the angle $\beta$ between line cd and the x'-y' plane, and the distance m between point m and n as follows.

$$\alpha = \text{Arctan} \left( (a/\tan \phi_a - b/\tan \phi_b)/(a+b) \right) \quad (3)$$

$$m = a \cos (\phi_a + \alpha)/\sin \phi_a \quad (4)$$

$$\beta = \text{Arccos} (m \sin \phi_c/c) - \phi_c \quad (5)$$

Let i, j, and k be the unit vectors in the x, y, and z directions; and let u, v, and w be the unit vectors in the u, v, and w directions. Let $u = u_x i + u_y j + u_z k$ and $v = v_x i + v_y j + v_z k$. We have $$u_x = ac_{v'} \cos \alpha/(a_{u'} c_{v'} - a_{v'} c_{u'}) \quad (6)$$

$$u_y = -ca_{v'} \cos \beta/(a_{u'} c_{v'} - a_{v'} c_{u'}) \quad (7)$$

$$u_z = (ac_{v'} \sin \alpha - ca_{v'} \sin \beta)/(a_{u'} c_{v'} - a_{v'} c_{u'}) \quad (8)$$

$$v_x = -ac_{u'} \cos \alpha/(a_{u'} c_{v'} - a_{v'} c_{u'}) \quad (9)$$

$$v_y = ca_{u'} \cos \beta/(a_{u'} c_{v'} - a_{v'} c_{u'}) \quad (10)$$

$$v_z = (ca_{u'} \sin \beta - ac_{u'} \sin \alpha)/(a_{u'} c_{v'} - a_{v'} c_{u'}) \quad (11)$$

where $(a_{u'}, a_{v'})$ and $(c_{u'}, c_{v'})$ are the u',v'-coordinates of points a and c, respectively.

Figure 13:
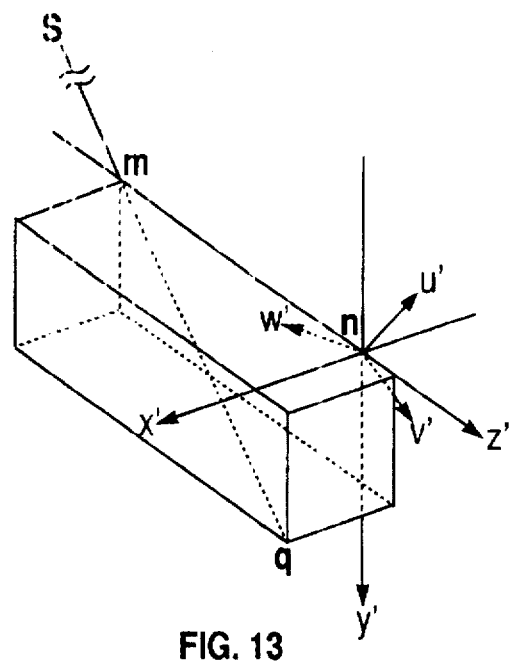
FIG. 13 illustrates the spatial relation between an optical center and a point of incidence.

Refer to FIG. 13. S is the sun, m is the optical center, and n is the origin of the x'-y'-z' and u'-v'-w' coordinate systems. For any beam of light reaching the sensing surface, the x',y',z'-coordinates for the point of incidence q can be obtained by first calling the GetPointOfIncid procedure to get its u,v-coordinates, ($q_u$, $q_v$), then using the following conversion equations:

$$q_x = q_u u_x + q_v v_x \quad (12)$$

$$q_y = q_u u_y + q_v v_y \quad (13)$$

$$q_z = q_u u_z + q_v v_z \quad (14)$$

where $$q_u = q_{u'} - n_u$$

and $$q_v = q_{v'} - n_v.$$

Knowing the x',y',z'-coordinates for q ($q_x$, $q_y$, $q_z$) and m (0; 0, -m), the reference line mq may be determined. Since the x, y, and z axes point to the same directions as the x', y', and z' axes, we can obtain the direction of the target-source line from that of line mq without transformation.

Global Values

The AutoVisor procedure references the following global values:
normalMode: BOOLEAN;
$M_x$, $M_y$, $M_z$: REAL;
m, $n_u$, $n_v$, $u_x$, $u_y$, $u_z$, $v_x$, $v_y$, $v_z$: REAL;
$g_x$: ARRAY [0..30] OF REAL;
$g_y$: ARRAY [0..7] OF REAL;
$g_z$, $gd_x$, $gd_y$: ARRAY [0..7] OF ARRAY [0..30] OF REAL;
normalMode is a boolean variable indicating whether the system is operating in the normal mode.

$M_x$, $M_y$, and $M_z$ are the x,y,z-coordinates of the target. Their values may vary, but they remain unchanged except when the driver adjusts them with the calibrating means or restores a previously saved values for them. When the system is installed on the vehicle, they are initialized with a default target location, which may be, for example, the eyepoint's coordinates for a driver of an average height in a normal placement of the seat.

m is the distance between points m and n computed with formula (4). $n_u$ and $n_v$ are the u,v-coordinates of point n computed with formulae (1) and (2). $u_x$, $u_y$, $u_z$, $v_x$, $v_y$ and $v_z$ are the x,y,z-components of the unit vectors u and v computed with formulae (6) through (11). These constants are computed and stored in the ROM (Read-Only Memory) after we rectify the source-tracking means.

$g_x$, $g_y$, and $g_z$ are arrays to store the x,y,z-coordinates for the grid points. The values for the $g_x$ and $g_y$ arrays are predetermined. The values for the $g_z$ array are measured, but the measurement only need to be done once, e.g., by the manufacturer, for a particular model of the vehicle. These grid points' coordinates are constant characteristics of the vehicle. They may also be stored in the ROM.

For every grid point we compute a set of direction numbers for the line connecting the grid point and the target. The set of direction numbers is normalized so that its z-member is 1. The x- and y-members of the set of direction numbers are stored in the $gd_x$ and $gd_y$ array, respectively. Note that the x-member may also be regarded as the slope ($\Delta x/\Delta z$) of the projection of the line on the x-z plane, and the y-member the slope ($\Delta y/\Delta z$) of the projection of the line on the y-z plane. The values stored in the $gd_x$ and $gd_y$ arrays are therefore called the slope values. The slope values may change, and they are updated whenever normalMode is reset to TRUE or the target's z-coordinate is changed.

Listing of the AutoVisor Procedure

Following is a listing of the AutoVisor Procedure.

```
PROCEDURE AutoVisor;
CONST
    MaxHorizIndex = 7;
    MaxVertIndex = 30;
    FudgeFactor = 0.05;
    Default_x = 1000; (* An x-coordinate far beyond the edge of the windshield. *)
    Default_y = 500;  (* A y-coordinate far beyond the edge of the windshield. *)
VAR
    old_x, old_y, new_x, new_y: REAL; (* The old and new coordinates of the shading position. *)
    P_x, P_y, P_z, R_x, R_y, R_z, S_x, S_y, S_z, T_x, T_y, T_z, r, s, t, det, q_u, q_v, q_u', q_v', q_x', q_y', q_z',
       d_x, d_y: REAL; (* See disclosure. *)
    h1, h2, v1, v2: INTEGER; (* Running indices for horizontal & vertical grid lines. *)
    mind_x, maxd_x, mind_y, maxd_y: REAL; (* The minimum and maximum of the slope values
       d_x and d_y for the lines connecting the target and the four grid points of a mesh. *)
    fudge_x, fudge_y: REAL; (* The tolerance for comparing slope values. *)
    found: BOOLEAN; (* True iff a mesh is found to intersect with the target-source line. *)
    H_x, H_y, H_z: REAL; (* The x,y,z-coordinates of grid point H. cf FIG. 14. *)
BEGIN
    old_x := Default_x;
    old_y := Default_y;
    WHILE TRUE DO BEGIN
        IF normalMode THEN BEGIN
            new_x := Default_x;
            new_y := Default_y;
            GetPointOfIncid(q_u, q_v);
            q_u' := q_u - n_u;
            q_v' := q_v - n_v;
            q_x' := q_u'*u_x + q_v'*v_x;
            q_y' := q_u'*u_y + q_v'*v_y;
            q_z' := q_u'*u_z + q_v'*v_z;
            d_x := q_x' / (q_z' + m);
            d_y := q_y' / (q_z' + m);
            fudge_x := d_x * FudgeFactor;
            fudge_y := d_y * FudgeFactor;
            (* For every mesh on the windshield . . . *)
            h1 := 0; h2 := 1; v1 := 0; v2 := 1;
            found := FALSE;
            WHILE NOT found AND h1 < MaxHorizIndex DO BEGIN
                WHILE NOT found AND v1 < MaxVertIndex DO BEGIN
                    mind_x := Min4(gd_x[h1][v1], gd_x[h1][v2], gd_x[h2][v1], gd_x[h2][v2]);
                    maxd_x := Max4(gd_x[h1][v1], gd_x[h1][v2], gd_x[h2][v1], gd_x[h2][v2]);
                    mind_y := Min4(gd_y[h1][v1], gd_y[h1][v2], gd_y[h2][v1], gd_y[h2][v2]);
                    maxd_y := Max4(gd_y[h1][v1], gd_y[h1][v2], gd_y[h2][v1], gd_y[h2][v2]);
                    (* If it satisfies the slope condition . . . *)
                    IF d_x > (mind_x - fudge_x) AND d_x < (maxd_x + fudge_x) AND
                       d_y > (mind_y - fudge_y) AND d_y < (maxd_y + fudge_y) THEN BEGIN
                        (* Find its intersection with the target-source line. *)
                        H_x := g_x[v1]; H_y := g_y[h2]; H_z := g_z[h2][v1];
                        P_x := M_x - H_x; P_y := M_y - H_y; P_z := M_z - H_z;
                        R_x := g_x[v2] - H_x; (* R_y = 0. *) R_z := g_z[h2][v2] - H_z;
                        (* S_x = 0. *) S_y := g_y[h1] - H_y; S_z := g_z[h1][v1] - H_z;
                        T_x := d_x; T_y := d_y; T_z := 1;
                        det := R_x*S_y*T_z + R_x*S_z*T_y - R_z*S_y*T_x; (* R_y = S_x = 0. *)
                        r := (P_x*S_y*T_z + P_y*S_z*T_x + P_z*S_x*T_y - P_z*S_y*T_x) / det;
                        IF r < -FudgeFactor OR (r - 1) > FudgeFactor THEN EXIT;
                        s := (R_x*P_y*T_z + R_z*P_x*T_y - R_x*P_z*T_y - R_z*P_y*T_x) / det;
                        IF s < -FudgeFactor OR (s - 1) > FudgeFactor THEN EXIT;
```

```
        (* The intersection is inside the boundary of the mesh. Compute the x,y-
              coordinates of the shading position *)
           t := R_x*S_y*P_z + R_x*S_z*P_y - R_z*S_y*P_x) / det;
           new_x := M_x - t * d_x;
           new_y := M_y - t * d_y;
           found := TRUE;
        END;
        (* If the intersection is not inside the mesh, try the next mesh. *)
        v1 := v1 + 1; v2 := v2 + 1;
     END; (* going through vertical grid lines *)
     v1 := 0; v2 := 1;
     h1 := h1 + 1; h2 := h2 + 1;
  END; (* going through horizontal grid lines *)
  END ELSE BEGIN
     (* M_x-M_y setting mode. *)
     new_x := M_x;
     new_y := M_y;
  END;
  (* Move the visor if the new shading position is different from the old. *)
  IF (old_x < > new_x OR old_y < > new_y) THEN BEGIN
     MoveVisor(new_x, new_y);
     old_x := new_x;
     old_y := new_y;
  END;
 END;
END;
```

Operation of the AutoVisor Procedure

Figure 15:
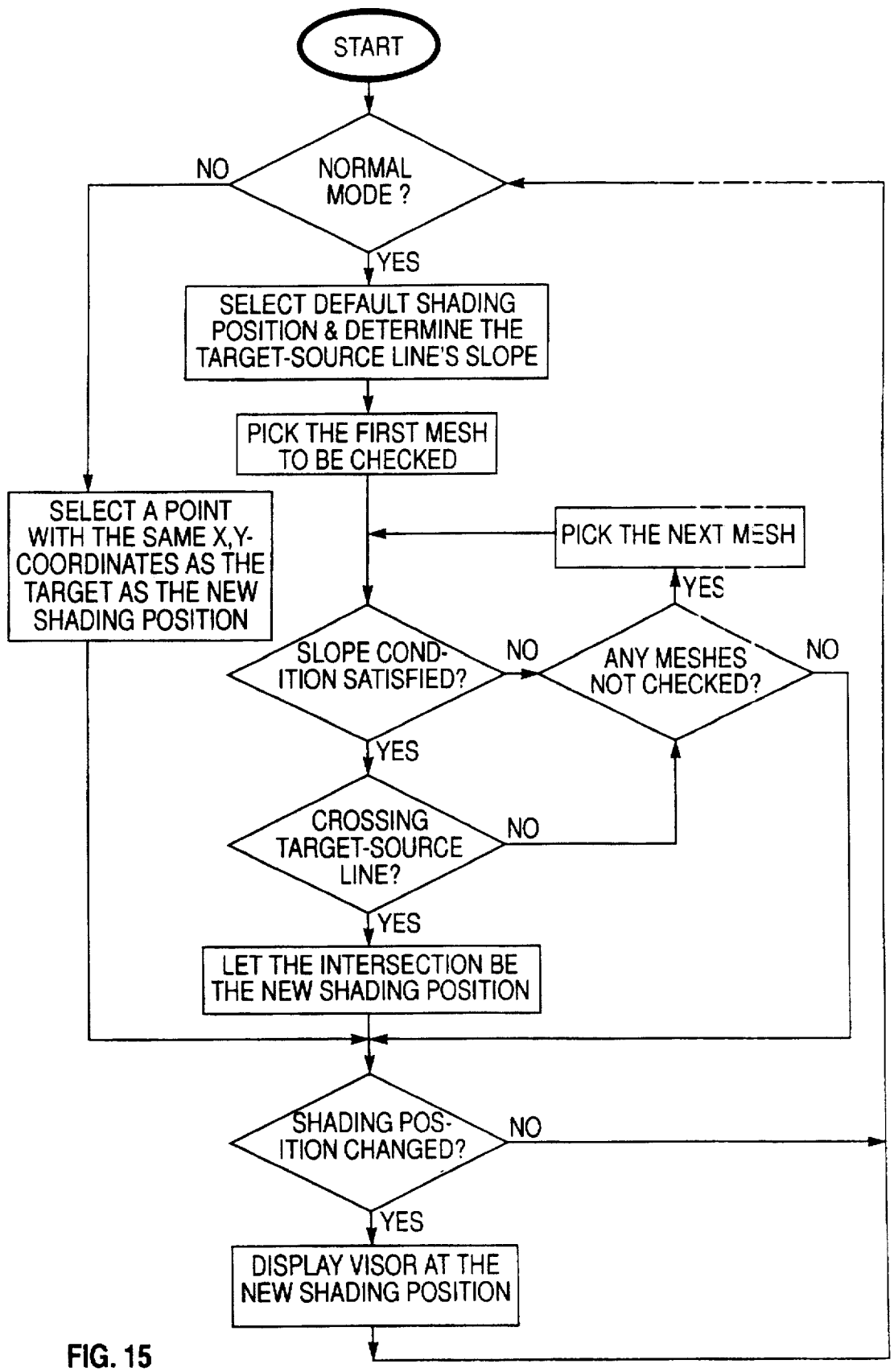
FIG. 15 is a flowchart of the AutoVisor procedure.

FIG. 15 is a flowchart of the AutoVisor procedure. Once invoked, this procedure repeats a loop of operations until the power is turned off. What it does in each loop depends on the value of the normalMode flag.

If normalMode is TRUE, the system operates in the normal mode. In this mode, AutoVisor first calls the GetPointOfIncid procedure to get the u,v-coordinates of point q and convert them to the x'-y'-z' coordinates with formulae (12), (13) and (14). Then it calculates the slope values of the projections of line mq on the x-z plane as follows.

$$d_x = \Delta x/\Delta z = q_x/(q_z+m) \quad (15)$$

$$d_y = \Delta y/\Delta z = q_y/(q_z+m) \quad (16)$$

For any mesh on the windshield, if $d_x$ is within the range of the $gd_x$ values for the four grid points of the mesh, and $d_y$ is within the range of the $gd_y$ values for these four grid points, it is possible for the target-source line to intersect with this mesh. AutoVisor checks through every mesh to see which mesh satisfies this "slope condition." (The $Min_4$ and $Max_4$ functions return the minimum and maximum, respectively, among the four given arguments.)

If a mesh is found to satisfy this condition, AutoVisor checks to see whether the target-source line does intersect with the mesh. The computation is described below.

Figure 14:
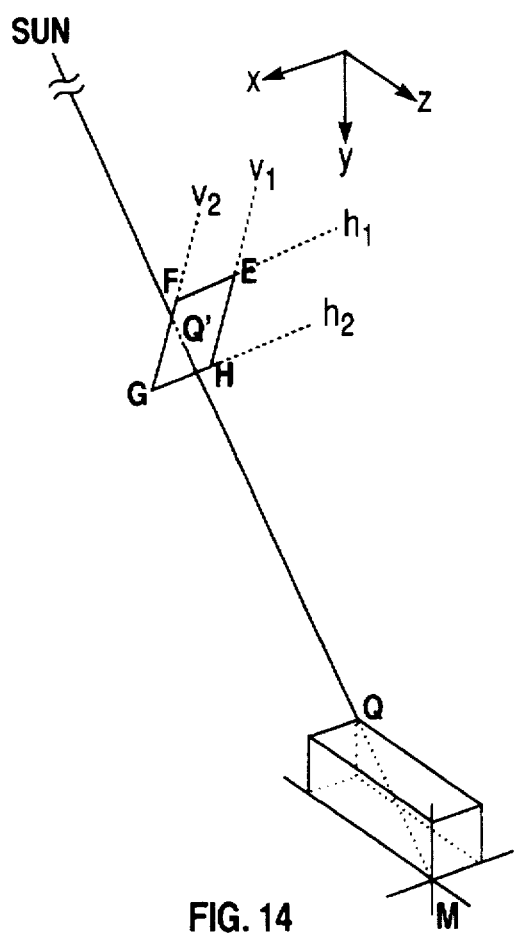
FIG. 14 illustrates the spatial relation between a target and a mesh on a windshield.

Refer to FIG. 14. Point M is the target. Line QM is the target-source line. Every point on this line can be expressed as $$M - t(d_x i + d_y j + k) \quad (17)$$

EFGH represents a mesh. The indices for the grid lines enclosing this mesh are v1, v2, h1, and h2. Assume the windshield area enclosed by the mesh is flat. Every point on the same plane can be expressed as $$H + r(G-H) + s(E-H) \quad (18)$$

At point Q', where line QM intersects with this plane, we have $$M - t(d_x i + d_y j + k) = H + r(G-H) + s(E-H),$$

or $$rR + sS + tT = P, \quad (19)$$

where $$R = G - H,$$

$$S = E - H,$$

$$T = d_x i + d_y j + k,$$

and $$P = M - H.$$

If the values for both r and s are within 0 and 1, the intersection is indeed inside the mesh. If so, Q' is the shading position. AutoVisor computes the x,y-coordinates of point Q' with (17) and calls the MoveVisor procedure to move the visor to the shading position. Otherwise (the intersection is outside the mesh), AutoVisor goes on to look for the next mesh that satisfies the slope condition and do the same as above, until a mesh is found to be intersecting with the target-source line or that all the meshes have been checked. If none of the meshes is found to intersect with the target-source line, the whole windshield becomes transparent.

If normalMode is FALSE, AutoVisor operates in the special "$M_x$-$M_y$ setting" mode, in which it always moves the visor to a point on the windshield where the x,y-coordinates are ($M_x$, $M_y$).

In short, the AutoVisor procedure continuously computes the coordinates of the shading position and displays the visor at the shading position. In the normal mode, the shading position is the intersection of the windshield surface with the target-source line. In the special mode, the shading position is the point on the windshield having the same x,y-coordinates as the target. The AutoVisor procedure presented here is only an example. A person skilled in the art may certainly provide algorithms for optimal performance under various conditions.

Control Panel

Figure 10:
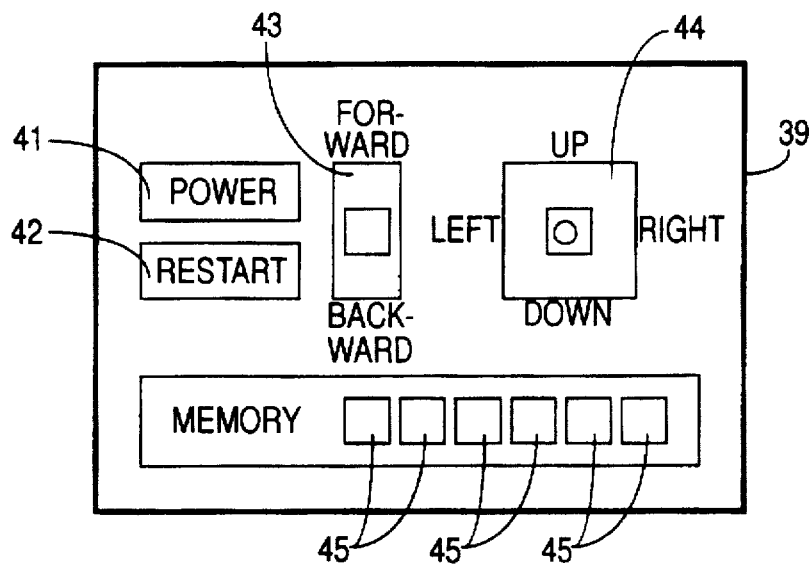
FIG. 10 shows the design of a control panel.

The control panel can be installed anywhere on the automobile within easy reach of the driver in a normal driving position. FIG. 10 shows a design of the control panel 39 which comprises switches 41, 42, 43, 44, and 45.

Switch 41 may turn the power to the system on or off. When the power is turned on, the normalMode flag is reset to TRUE, the AutoVisor procedure is invoked, and the other switches on the control panel becomes functional, as described below.

If switch 42 is pushed, the normalMode flag is reset to TRUE.

If switch 43 is pushed, the normalMode flag is also reset to TRUE, and the z-coordinate of the target, $M_z$, may be changed. If the switch is pushed upwards, $M_z$ is decreased; if it is pushed downwards, $M_z$ is increased.

If switch 44 is pushed, the normalMode flag is set to FALSE, and the x,y-coordinates of the target, $M_x$ and $M_y$, may be changed. If the switch is pushed upwards (downwards), $M_y$ is decreased (increased). If it is pushed to the left (right), $M_x$ is increased (decreased).

If either switch 43 or 44 is pushed and held in one direction for more than a couple of seconds, the coordinate(s) are changed at a faster paste.

If anyone of the switches 45 is pressed inwards for more than a couple of seconds, the current target location is saved in the memory. If the switch is pressed and immediately released, a target location previously saved will replace the current target location. When the system is installed, a default target location is saved for every one of these switches.

Calibrating the System

We may use step 1 and step 2 below to calibrate the system.

Step 1. Push switch 44 until the visor is positioned straight in front of, and at the same height as, the eyes.

Step 2. Push switch 43 until the visor correctly shades the eyes from direct sunlight.

If the driver pushes switch 44, the system will stop its normal mode of operation, i.e., the visor no longer follows the sun. The driver may move the visor by pushing switch 44 in different directions. If the visor is moved to be straight in front of, and at the same height as, the eyes, $(M_x, M_y)$ will be the same as the x,y-coordinates of the eyepoint.

After doing so, the driver may push switch 42 or 43, so that the system resumes its normal mode of operation. If the visor happens to correctly shade the eyepoint, the current value for $M_z$ is just right, i.e., the same as the z-coordinate of the eyepoint, and there will be no need for step 2. Otherwise, the driver proceeds to step 2. In step 2, when switch 43 is pushed one way or the other, the driver will see that the visor is moved toward or away from the sun in her view. When the visor correctly shades the eyes from direct sunlight, $M_z$ will be the same as the z-coordinate of the eyepoint.

Thus with the surprisingly simple method described above, the driver may easily and accurately determine the location of the eyepoint and move the target to coincide with the eyepoint, without the need to directly measure the eyepoint's coordinates and manually input the measured coordinates to the system.

It is worth noting that, if the visor is smaller, the calibration will be more accurate. It is also worth noting that, this method provides very clear visual feedback for the user to ensure the accuracy of calibration. In step 1, when $M_x$ and $M_y$ are the same as the x,y-coordinates of the eyepoint, the user will see the visor straight in front at the same height as the eyes. It is especially unique in step 2: When $M_z$ is the same as the z-coordinate of the eyepoint, the user will see the visor exactly shades her eyes from direct sunlight.

After the calibration described above, the driver can save the values for $M_x$, $M_y$, and $M_z$ in a non-volatile memory, by pressing one of the switches 45 and holding it inwards for a couple of seconds. Next time she drives the car, if the target location is changed by someone else, she can press this switch to restore the set of values that she previously saved.

Although the eyepoint's location may vary greatly for drivers of different stature in different placement of her seat, it is found that, for a particular driver in a particular placement of the seat, the eyepoint's location does not vary so much due to her eyes or head's movement during normal driving. As a matter of fact, the eyepoint's location may vary as much as one foot (30 cm) or more due to the difference in the driver's stature and the placement of the seat; but it may only vary a few centimeters or less due to her eyes or head's movement during travel, unless the driver significantly changes her poise. Hence once the system is calibrated as described above, the visor design of FIG. 9 will be large enough to always shade the eyes while allowing adequate room for the driver's eyes and head to move during travel. However, compared to conventional visors, this visor is very small, and the driver can see a virtually open view through the windshield.

With this kind of calibrating means, there is no need for a special equipment to continuously determine and update the eyepoint's location. But if the special equipment is used, depending on the equipment's accuracy, the visor can be made smaller, even down to two coin-sized plates separated by a distance equaling that between the eyes.

If desired, this system can easily be modified to support many optional features, such as the following:

The system may automatically vary the size of the visor depending on the distance of the visor from the target, so that the visor would be larger when it is farther away, and smaller when it is closer to the target.

The liquid crystal cells in the visor area may be set in different grey patterns and gray levels.

The system may block multiple light sources against the same eyepoint using multiple visors without adding any physical parts. This is useful because occasionally in addition to the light coming directly from the sun, there may be bright reflection of sunshine from the neighboring vehicles or buildings that we like to be blocked, too.

Similarly, the system may shade the eyes for multiple occupants in the vehicle using multiple visors. For example, it may display an extra visor for the front passenger, provided that the system is calibrated for both occupant's eyes.

We may also have a number of the visor systems installed at multiple places on the same vehicle, such as the sun roof, the side or rear windows, etc., with some parts of the systems being shared by all.

EXAMPLE 2

This embodiment is similar to what is described in Example 1. The major differences are described below.

Figure 16:
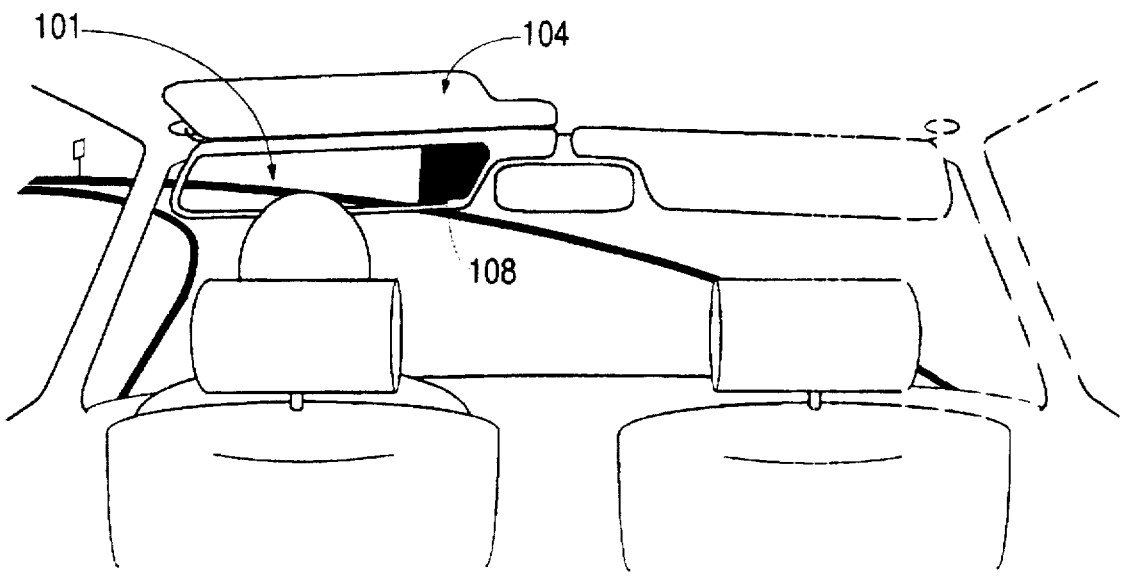
FIG. 16 is an internal view of a vehicle.
Figure 17:
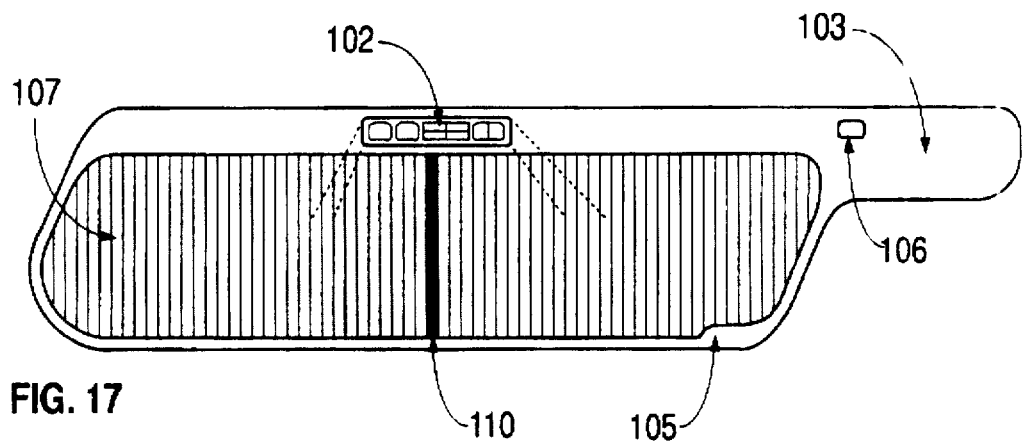
FIG. 17 is the front view of a visor system.

FIG. 16 shows an internal view of an automobile. The system comprises a screen 101 pivotably mounted near the windshield like the conventional visor 104. FIG. 17 shows the front view of the screen. The control panel 102 is at the top, and the control circuit 103 is housed on the right. Also on the right is a mini-speaker 106 to provide audible help for the user.

The source-tracking means comprises a one-dimensional CCD 105 at the lower-right corner of the screen facing the front of the vehicle. The array of the photon-sensitive sites in the CCD is approximately parallel to the top edge of the screen. The lid covering the CCD has a narrow slit approximately forming a right angle with the array.

It is advantageous to fix the CCD on the screen. For example, the source-tracking means may be rectified by the manufacturer before shipment, rather than by the installer or the user after installation. Being in one piece, the system is easy to install. It can be as simple as clipping the green to the conventional visor.

The screen comprises a layer of liquid crystal film affixed to a sheet of glazing material, such as glass plastic, that has appropriate rigidity and conforms to the safety code. The film can be made with conventional techniques, such as Raychem Corporation's NCAP technologies, so that a one-dimensional array of stripes or pixels 107 on the screen may be selectively turned transparent or opaque. Each stripe is sufficiently narrow that it would require a plurality of stripes turned opaque to shade either eye from direct sunlight.

Figure 18:
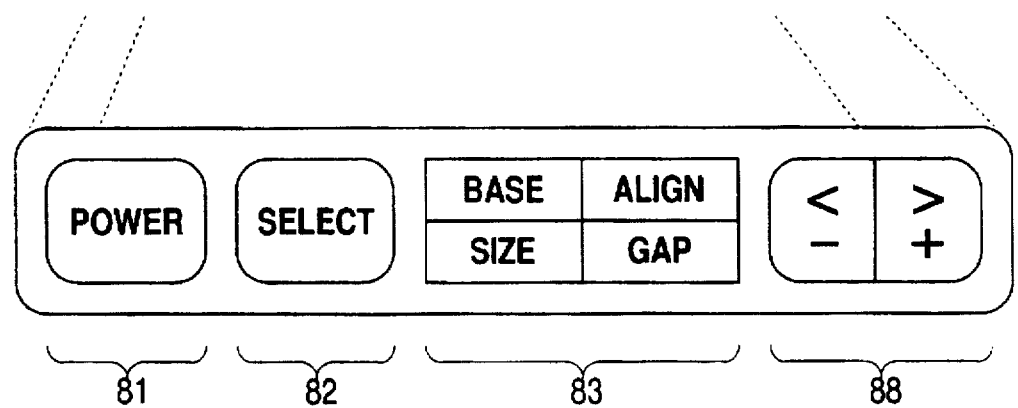
FIG. 18 shows the design of a control panel.

FIG. 18 shows a magnified view of the control panel. It has four switches (81, 82, and 88) and an indicator 83. The POWER switch 81 allows the driver to turn the power to the system on or off. When the power is turned off, all pixels are opaque; and the screen may be used in the same way as the conventional visor, namely, to be flipped down to block the sun, or flipped up to be stowed. When the power is turned on, all pixels become transparent except that, some pixels may remain opaque to form the visor, i.e., an opaque area (108 in FIG. 16) that may shade the driver's eyes from the sun. As the vehicle turns, the visor will follow the movement of the sun to the left or right. If the vehicle makes a wider turn such that the sun goes out of range, the whole screen will become transparent.

The SELECT switch 82 allows the driver to select one of the four parameters that may be adjusted to calibrate or customize the system. The indicator 83 consists of four sections labeled as BASE, ALIGN, SIZE, and GAP, each section representing one of the four parameters that may be adjusted. Pressing the SELECT switch, the driver may cycle through the four selections, and the indicator will always indicate the current selection by brightening the section representing the selected parameter and darkening the other three sections. The two adjustment switches 88 may be used to adjust the value of the selected parameter, as described below. The left adjustment switch is marked with "<" and "−" signs; the right adjustment switch is marked with ">" and "+".

Positioning the base line. If the SELECT switch is pressed so that the BASE section of the indicator is brightened, all pixels except one (110 in FIG. 17) will become transparent. The single opaque pixel is called the "base line.". This embodiment uses a two-dimensional coordinate system, in which the x-axis is parallel to the top edge of the screen, and the z-axis is perpendicular to the surface of the screen. The system always positions the base line to have the same x-coordinate as the target. If the driver presses the left adjustment switch (marked with "<"), the base line will move to the left; if the right adjustment switch (marked with ">") is pressed, the base line will move to the right. If the driver looks at the top edge of the screen in a direction perpendicular to the edge, and moves the base line to where the line of sight meets the edge, the x-coordinate of the target will be the same as that of the eyepoint.

Aligning the visor. If the SELECT switch is pressed so that the ALIGN section appears bright, a number of pixels will turn opaque to form the visor, and the system will operate in its normal mode. If the left (right) adjustment switch is pressed, the visor will move to the left (right). When either of the adjustment switches is pressed, the system actually changes the z-coordinate of the target. With the base line properly positioned as described above, if the visor is now moved to align with the sun and the eyes, the z-coordinate of the target is also the same as that of the eyepoint. With the target coincident with the eyepoint, the system will always correctly function in shading the eyes from direct sunlight, unless the driver changes the placement of her seat or the slant of the screen.

Adjusting subarea's size. The visor consists of two subareas of the same size (width). The center-to-center distance between the subareas is called the gap. If the gap is smaller than the size, the two subareas will merge together and appear as a single opaque area. If the SELECT switch is pressed so that the SIZE section appears bright, all pixels except some adjacent ones will appear transparent. The overall width of the opaque pixel(s) is the same as the subarea's width. The driver may adjust the size by pressing the adjustment switches. If the left adjustment switch (marked with "−") is pressed, the subareas become thinner; if the right adjustment switch (marked with "+") is pressed, the subareas become wider.

Adjusting subarea's gap. If the SELECT switch is pressed so that the GAP section appears brightened, all pixels except two will become transparent. The two opaque pixels are separated by a distance the same as the gap between the subareas. The gap may be adjusted by pressing the adjustment switches. If the left (right) adjustment switch is pressed, the gap will become smaller (larger). The goal is to adjust the gap so that it matches the distance between the eyes.

The software used in this embodiment is similar to that in Example 1. The major differences are: (a) Since all pixels lie on the same plane, the computation is greatly simplified; (b) The normal-mode shading positions for all possible coordinates of the target and all possible directions of the sun are precomputed and stored in a lookup table; (c) The program only uses integer arithmetic, without invoking any floating point arithmetic or trigonometric functions. With table lookup and integer arithmetic, a fast processing speed is achievable with a low cost processor.

EXAMPLE 3

This embodiment is similar to that of Example 2. The major differences are described below.

This embodiment uses a three-dimensional coordinate system. Although the pixel array on the screen is only one dimensional, a two-dimensional CCD is used in place of the one-dimensional CCD. The aperture in front of the CCD is a pinhole instead of a slit.

There is a sensor that senses the slant of the screen. The sensor may be, for example, a small variable resistor attached to the axle about which the screen is pivoted. The output from the variable resistor is fed to the control circuit and interpreted as the angle of slant. The slant is taken into account in computing the shading position.

Figure 19:
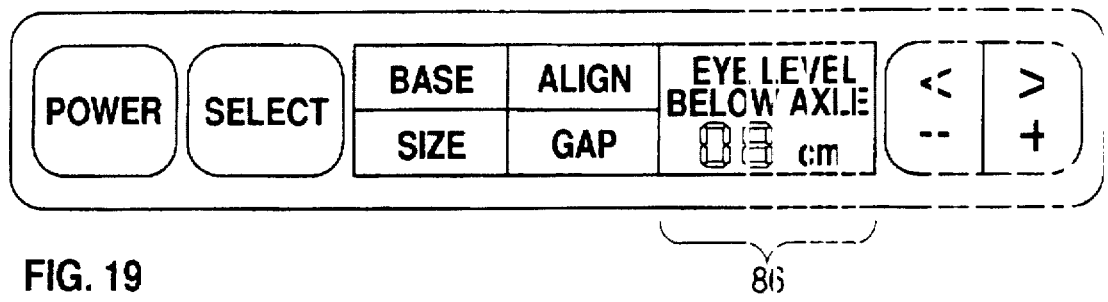
FIG. 19 shows the design of a control panel.

As shown in FIG. 19, the control panel has an eye-level indicator 86 to indicate the driver's eye level in terms of centimeters (or inches, if desired) below the axle. If the SELECT switch is pressed so that the eye-level indicator is brightened, the driver may adjust the eye level by pressing the adjustment switches. If the left adjustment switch (marked with "−") is pressed, the number in the eye-level indicator will be decreased; if the right adjustment switch (marked with "+") is pressed, the number will be increased. The goal is to adjust the number in the eye-level indicator so that it shows the distance the driver's eyes are below the axle.

The advantages of this embodiment over that of Example 2 are: (a) if the driver changes the slant of the screen, she does not have to recalibrate the system; and (b) This system may eliminate a problem with the system of Example 2, namely, the visor may show up on the screen even though the sun appears higher or lower than the screen. However, this embodiment has an undesirable feature: the driver has to measure or estimate her eye level.

EXAMPLE 4

This embodiment is similar to that of Example 3. The major differences are noted below.

Figure 20:
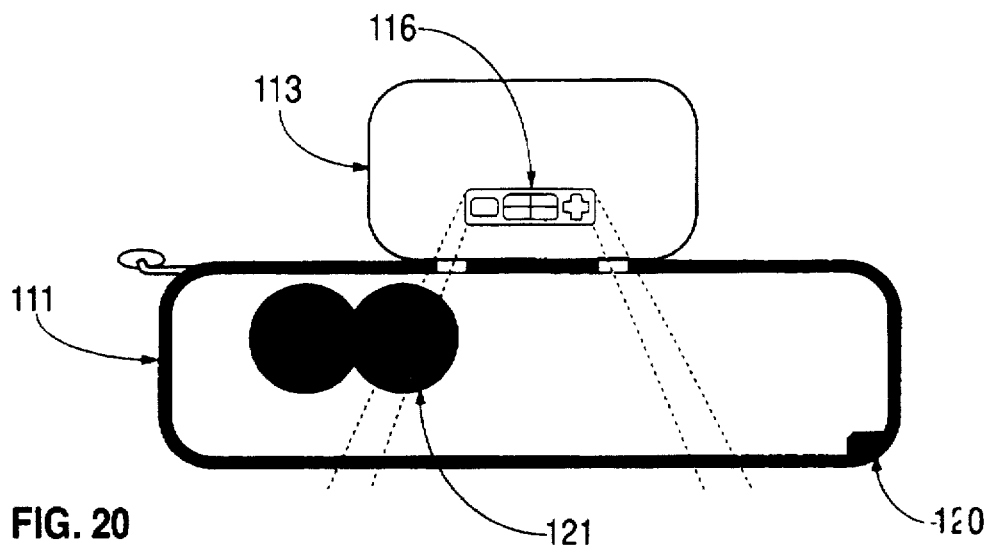
FIG. 20 shows a visor system.

As shown in FIG. 20, the system comprises a screen 111 mounted inside the car near the top of the windshield. The control circuit is housed in an auxiliary visor 113, which is pivotable around the same axle as the screen. If desired, a separate axle may be used. The control panel 116 faces the driver when the auxiliary visor is flipped up against the roof. The auxiliary visor also contains a mirror facing the other side, so that the driver may flip the auxiliary visor down to use the mirror.

In place of the two-dimensional CCD is an exposed RAM 120, which costs much less than the CCD.

The screen has a two-dimensional matrix of pixels instead of one-dimensional, and the pixels comprise electrochromic material instead of liquid crystals. Each pixel is significantly smaller than the size required to shade the eyes from the sun, so that it requires a plurality of pixels to be obscured to shade the eyes. The visor 121 consists of two round subareas, each serving to shade one of the eyes.

Figure 21:
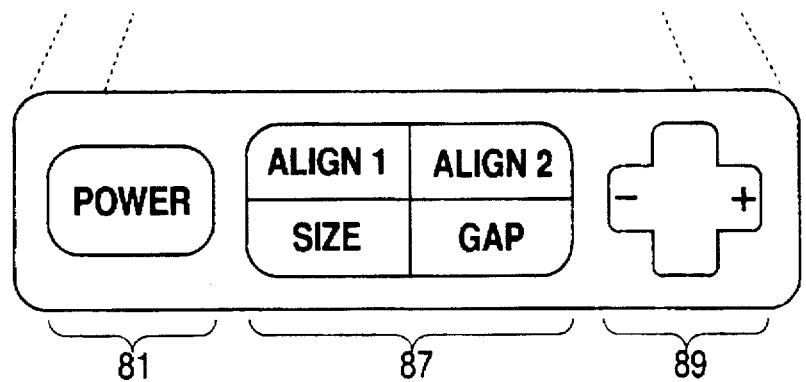
FIG. 21 shows the design of a control panel.

FIG. 21 shows a magnified view of the control panel. It has a power button 81, four selection buttons 87, and an adjustment button 89. There is no eye-level indicator, and there is no need for the user to measure or estimate her eye level. The selection buttons are labeled with "ALIGN 1", "ALIGN 2", "SIZE", and "GAP." If one of the selection buttons is pressed, the pressed button will become brighter than the other three buttons to indicate the selection made.

During normal mode of operation, as before, the system always continuously repositions the visor to shade a target location from direct sunlight. The system may also operate in the first or second alignment modes, as described below.

If the driver presses the "ALIGN 1" button so that it is brightened, the system will operate in the first alignment mode. In this mode, the driver may use the cross-shaped adjustment button to move the visor. If the left (right) end of the adjustment button is pressed, the visor is moved to the left (right); if the upper (lower) end is pressed, the visor is moved up (down). If the visor is moved to a position where the visor blocks the sun in the driver's sight, the sun, the visor, and the eyes are aligned. If the driver presses the "ALIGN 1" button again, the button will become darkened; the current position of the visor, together with the current point of incidence of the sunlight on the sensing means, will be stored in the memory as a set of data; and the system will resume its normal mode of operation. This set of data is used for determining the first eye-source line.

Similarly, if the driver presses the "ALIGN 2" button so that the button is brightened, the system will operate in the second alignment mode, in which the driver may also use the adjustment button to align the visor with the sun and the eyes. If the dryer presses the "ALIGN 2" button again, the button will become darkened; the current position of the visor, together with the current point of incidence, will be stored in the memory as another set of data; and the system will resume its normal mode of operation. This set of data is used for determining the second eye-source line.

Before the system resumes the normal mode of operation, it always uses the two sets of data in the memory to find the intersection of the two eye-source lines, and moves the target to the point of intersection. For more accurate results, the two alignment steps should be done when the sun appears at different locations in the driver's sight, preferably the two locations being as far apart as possible. Note that, although in theory the two eye-source lines should intersect (at the eyepoint), in practice they may not intersect at all, due to human errors and the machine's round-off errors. To resolve this, for example, we may use any algorithm known in the art to find a point which is closest to the two lines, and move the target there.

EXAMPLE 5

This embodiment is installed on an automobile to reduce or eliminate the headlight glare from on-coming cars at night. The system is similar to what is described in Example 1. The major differences are described below.

First, a different threshold value is used to find the excited photon sensitive sites in the CCD, because the intensity of headlights is lower than the sun. If desired, a different filter may be used.

Second, the source-tracking means comprises two line-finding means. Because the headlight of an on-coming car may come so close that the reference line is not parallel to the target-source line, one line-finding means can not provide sufficient information to determine the target-source line. Each line-finding means provides information for determining a reference line which connects the headlight and a known point. The two reference lines determine the headlight's location, which is the intersection of the two reference lines. The target-source line can then be determined from the locations of the headlight and the target.

The two line-finding means can be installed in appropriate places on the vehicle where the rays from the headlights to the line-finding means are not obstructed. Preferably the two line-finding means are separated as far as possible, in order to provide more accurate results.

Third, the shading positions for the two eyes are separately computed. Since the two beams of light from a headlight to the driver's two eyes are not parallel, two targets are used. With the calibrating means, one target is caused to coincide with the left eye, and the other target the right eye.

Fourth, the system must deal with multiple sources, because usually there are multiple headlights in sight. A conventional technique may be used to match and correspond the headlights' images captured by the two CCD's.

Fifth, for each eye, we need to have as many shading elements as there are bright headlights in sight. It may be desirable to reduce the size of the shading elements.

EXAMPLE 6

This embodiment is similar to that of Example 5. The major difference is that the system comprises special goggles for the driver. With a liquid crystal film on each lens, the goggles alternatingly expose one of the two eyes to the field of view. At any time there is only one eye exposed. The frequency of exposure is 30 times per second, so the movement of every object in the driver's view appears to be continuous. When the left (right) eye is exposed, the system only shows the shading elements for the left (right) eye on the windshield. In this way, the field of view for one eye is not shaded by the shading elements for the other eye, so that more area is visible for the driver. Due to the stereoscopic characteristics of human vision, the shading elements appear at different distances, i.e., where the headlights are.

Although the present invention has been disclosed and illustrated with particular embodiments in detail, it is to be clearly understood that the same is made herein by way of illustration and example only, and is not to be taken by way of limitation. The spirit and scope of the present invention are to be limited only by the terms of the appended claims.

What is claimed is:

1. A method for continuously repositioning a shading element to shade an eyepoint from the direct rays originated from a source of radiation; said method comprising the steps of:
   (a) finding at least two geometric entities containing said eyepoint, preferably said geometric entities being two lines and the intersection of said geometric entities being a point in space;
   (b) finding a point in said intersection; and
   (c) continuously repositioning said shading element to shade said point in said intersection from said direct rays.

2. The method of claim 1 wherein
   at least one of said geometric entities is the line connecting said eyepoint and said source; and
   said line is found while a repositioning means continuously repositions said shading element to shade a target location from said direct rays, by changing said target location until said shading element is repositioned by said repositioning means to shade said eyepoint from said direct rays.

3. The method of claim 1 wherein said step (c) is accomplished with a repositioning means which continuously repositions said shading element to shade a target location from said direct rays, by setting said target location at said point in said intersection.

4. A method for continuously repositioning a shading element to shade an eyepoint from the direct rays originated from a source of radiation, said method comprising the steps of:
   (a) finding a geometric entity containing said eyepoint, preferably there being only one point on said geometric entity that is collinear with said eyepoint and said source; and
   (b) while a repositioning means continuously repositions said shading element to shade a target location from said direct rays, changing said target location under the constraint of said geometric entity until said shading element is repositioned by said repositioning means to shade said eyepoint from said direct rays.

5. The method of claim 2, 3, or 4 wherein said repositioning means comprises the device of claim 5, 8, 10, or 11.

6. A device for continuously repositioning a shading element to shade a target location from the direct rays originated from a source of radiation, said device comprising:
   (a) means for positioning said shading element;
   (b) tracking means responsive to said radiation, said tracking means having a known geometric configuration so that spatial information relating to said source may be derived in accordance with said geometric configuration and the response of said tracking means to said radiation; and
   (c) means in an electric circuit with said means for positioning said shading element and said tracking means, for
   selecting a shading position between said target location and said source in accordance with said target location and said spatial information, so that said shading element positioned at said shading position will shade said target location from said direct rays; and
   producing signals for said means for positioning said shading element to position said shading element at said shading position.

7. The device of claim 6 wherein said tracking means comprises
   a plurality of sites responsive to said radiation and
   means for causing uneven distribution of said radiation over said sites;
   so that said spatial information may be derived in accordance with said geometric configuration and said distribution.

8. The device of claim 7 wherein said means for causing uneven distribution comprises means for forming on said sites the image of said source from at least one perspective.

9. A device for continuously repositioning a shading element to shade a target location from the direct rays originated from a source of radiation, said device comprising:
   (a) means for positioning said shading element;
   (b) means for providing information sufficient for determining the location of said source; and
   (c) means in an electric circuit with said means for positioning said shading element and said means for providing information, for
   selecting a shading position between said target location and said source in accordance with said target location and said information so that said shading element positioned at said shading position will shade said target location from said direct rays; and
   producing signals for said means for positioning said shading element to position said shading element at said shading position.

10. The device of claim 9 wherein said means for providing information comprises means for capturing the images of said source from a plurality of perspectives.

11. A device for continuously repositioning a shading element to shade a target location from the direct rays originated from a source of radiation, said device comprising:
   (a) a sheet comprising a plurality of cells through which the transmittance of said radiation being selectively changeable;
   (c) means for selectively changing the transmittance through said cells;
   (d) means for providing spatial information relating to said source;
   (e) means for holding said means for providing spatial information in a known spatial relation with respect to said sheet;
   (f) means in an electric circuit with said means for changing transmittance and said means for providing spatial information, for selecting a shading position between said target location and said source in accordance with said target location and said spatial information, so that said shading element positioned at said shading position will shade said target location from said direct rays; and producing signals for said means for changing transmittance to form said shading element at said shading position.

12. A device for continuously repositioning a shading element to shade an object at a target location from the direct rays originated from a source of radiation, said device comprising:

(a) a plurality of cells through which the transmittance of said radiation being selectively changeable, the size of each of said cells being sufficiently small that it requires a plurality of said cells with reduced transmittance to form said shading element of a sufficient size to shade said object at said target location from said direct rays;

(b) means for selectively changing the transmittance through said cells;

(c) means for providing spatial information relating to said source; and (d) means in an electric circuit with said means for changing transmittance and said means for providing spatial information, for selecting a shading position between said target location and said source in accordance with said target location and said spatial information, so that said shading element positioned at said shading position will shade said object from said direct rays; and producing signals for said means for changing transmittance to form said shading element at said shading position.

13. A system for continuously repositioning a shading element to shade an eyepoint from the direct rays originated from a source of radiation, said system comprising:

(a) said shading element;

(b) holding means for holding electrical values representing a target location, said values being referenced by the repositioning means in (c) and changeable by the calibrating means in (d);

(c) repositioning means for continuously repositioning said shading element to shade said target location from said direct rays; and (d) calibrating means in an electrical circuit with said holding means and said repositioning means, for determining the location of said eyepoint and changing said values to represent the determined location of said eyepoint.

14. The system of claim 13 wherein said calibrating means comprises means for changing said values so that the line connecting said eyepoint and said source may be found by changing said values until said shading element is repositioned by said repositioning means to shade said eyepoint from said direct rays.

15. The system of claim 13 wherein said calibrating means comprises means for finding a point in the intersection of a plurality of geometric entities, preferably said geometric entities being lines connecting said eyepoint and said source at different locations; and changing said values to represent said point in said intersection.

16. The system of claim 13 wherein said calibrating means comprises means for changing said values in such a way that said target location is confined within the constraint of a geometric entity, preferably there being only one point on said geometric entity that is collinear with said eyepoint and the current location of said source.

17. The system of claim 13 wherein said calibrating means comprises means for continuously repositioning said shading element in a predetermined direction relative to said target location.

18. The system of claim 13 wherein said calibrating means comprises means for generating and receiving periodic waves for determining the location of said eyepoint, and means for changing said values to represent the determined location of said eyepoint.

19. The system of claim 13 wherein said calibrating means comprises means for continuously determining the current location of said eyepoint and means for continuously changing said values to represent said current location.

20. A system for continuously repositioning a shading element to shade the eyes of a user from the direct rays originated from a source of radiation, said system comprising:

(a) said shading element;

(b) exposing means for alternatingly exposing one of said eyes to a field of view, preferably the frequency of exposure for each eye being sufficient for the persistence of said user's vision to cause the motion of objects in said field of view to appear continuous;

(c) repositioning means for continuously repositioning said shading element to shade a target location from said direct rays; and (d) means in an electric circuit with said exposing means and said repositioning means, for changing said target location to the location of the exposed eye.

21. The system of claim 13 or 20 wherein said repositioning means comprises the device of claim 5, 8, 10, or 11.

* * * * *